(12) United States Patent
Lee et al.

(10) Patent No.: US 12,119,674 B2
(45) Date of Patent: Oct. 15, 2024

(54) DISPLAY DEVICE AND ELECTRONIC DEVICE INCLUDING THE SAME

(71) Applicant: Samsung Display Co., Ltd., Yongin-si (KR)

(72) Inventors: Soongyu Lee, Seoul (KR); Jinwoo Kim, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 642 days.

(21) Appl. No.: 17/363,902

(22) Filed: Jun. 30, 2021

(65) Prior Publication Data

US 2022/0069634 A1    Mar. 3, 2022

(30) Foreign Application Priority Data

Aug. 31, 2020    (KR) .................... 10-2020-0110422

(51) Int. Cl.
*H02J 50/80*    (2016.01)
*G06F 1/16*    (2006.01)
(Continued)

(52) U.S. Cl.
CPC ............ *H02J 50/80* (2016.02); *G06F 1/1635* (2013.01); *G06F 3/03545* (2013.01); *H02J 50/10* (2016.02); *H02J 2310/22* (2020.01)

(58) Field of Classification Search
CPC ........ H02J 50/80; H02J 50/10; H02J 2310/22; H02J 7/00034; G06F 1/1635; G06F 3/03545; G06F 3/0383; G06F 1/1637; G06F 1/1643; G06F 1/1684; G06F 1/1698; G06F 1/266; G06F 3/044; G06F 3/0412; G06F 3/04164; G06F 3/0441; G06F 3/0442; G06F 3/0446; G06F 2203/04102;
(Continued)

(56) References Cited

U.S. PATENT DOCUMENTS 10,564,736 B2    2/2020    Lee et al.
10,809,826 B2    10/2020    Kwon et al.
(Continued)

FOREIGN PATENT DOCUMENTS

KR    10-1124522 B1    3/2012
KR    10-2016-0120969 A    10/2016
(Continued)

*Primary Examiner* — Jack Chiang
*Assistant Examiner* — Brandon Bowers
(74) *Attorney, Agent, or Firm* — Lewis Roca Rothgerber Christie LLP

(57) ABSTRACT

A display device includes: a display panel comprising a display area at which an image is displayed; an input sensor on the display panel and configured to operate in a first mode to sense a first input or in a second mode to sense a second input provided by an input device; a sensor controller configured to control an operation of the input sensor; and a wireless power supply configured to transmit a wireless power signal to the input device at a transmission frequency in response to the input sensor operating in the second mode, wherein the sensor controller is configured to transmit an uplink signal to the input device through the input sensor in the second mode, and the uplink signal comprises a set signal corresponding to the transmission frequency of the wireless power signal.

20 Claims, 17 Drawing Sheets

(51) Int. Cl.
*G06F 3/0354* (2013.01)
*H02J 50/10* (2016.01)

(58) Field of Classification Search
CPC ....... G06F 2203/04111; G06F 3/04162; G06F 2203/04106; Y02B 90/20; Y04S 20/00
See application file for complete search history.

(56) References Cited

U.S. PATENT DOCUMENTS

| | | | |
|---|---|---|---|
| 2010/0238121 A1* | 9/2010 | Ely | G06F 3/046 345/173 |
| 2016/0026301 A1* | 1/2016 | Zhou | G06F 3/0412 345/173 |
| 2018/0232070 A1 | 8/2018 | Katsurahira | |
| 2020/0099245 A1* | 3/2020 | Ruscher | G06F 1/1626 |

FOREIGN PATENT DOCUMENTS

| KR | 10-1976361 B1 | 5/2019 |
|---|---|---|
| KR | 10-2020-0015979 A | 2/2020 |

* cited by examiner

First Charging Mode

Second Charging Mode

DISPLAY DEVICE AND ELECTRONIC DEVICE INCLUDING THE SAME

CROSS-REFERENCE TO RELATED APPLICATION

The present application claims priority to and the benefit of Korean Patent Application No. 10-2020-0110422, filed on Aug. 31, 2020, the entire content of which is hereby incorporated by reference.

BACKGROUND

1. Field

Aspects of some embodiments of the present disclosure relate to a display device and an electronic device including the same.

2. Description of the Related Art

Multimedia electronic devices, such as televisions, mobile phones, tablet computers, navigation units, and game units, generally include a display device to display images. The electronic devices may include an input sensor that provides a touch-based input method allowing users to relatively easily and intuitively input information or commands in addition to the usual input methods, such as a button, a keyboard, a mouse, etc.

The input sensor may sense touch or pressure with the user's body. Meanwhile, there is an increasing demand for the use of an active pen for users who are familiar with the input of information with a writing instrument or for precise touch input for a specific application, for example, an application program for sketching or drawing.

The above information disclosed in this Background section is only for enhancement of understanding of the background and therefore the information discussed in this Background section does not necessarily constitute prior art.

SUMMARY

Aspects of some embodiments of the present disclosure relate to a display device and an electronic device including the same. For example, aspects of some embodiments of the present disclosure relate to a display device and an electronic device including the display device and an input device.

Aspects of some embodiments of the present disclosure include a display device capable of supplying power to an input device to charge the input device while sensing an input generated by the input device.

Aspects of some embodiments of the present disclosure include an electronic device including the display device.

According to some embodiments of the inventive concept, a display device includes: a display panel including a display area at which an image is displayed, an input sensor on the display panel and configured to operate in a first mode to sense a first input or in a second mode to sense a second input provided by an input device, a sensor controller configured to control an operation of the input sensor, and a wireless power supply configured to transmit a wireless power signal to the input device at a transmission frequency in response to the input sensor operating in the second mode. The sensor controller is configured to transmit an uplink signal to the input device through the input sensor in the second mode, and the uplink signal includes a set signal corresponding to the transmission frequency of the wireless power signal.

According to some embodiments, the sensor controller is configured to sense the first input through the input sensor during a first input sensing frame and to sense the second input through the input sensor during a second input sensing frame, and the wireless power supply is configured to transmit the wireless power signal to the input device during a power supply frame.

According to some embodiments, the second input sensing frame includes an input sensing period in which the sensor controller is configured to sense the second input through the input sensor and a pause period in which the sensor controller is configured to not sense the second input through the input sensor. The power supply frame includes a power supply period in which the wireless power signal is transmitted to the input device through the wireless power supply at the transmission frequency, and the pause period overlaps the power supply period.

According to some embodiments, the input sensing period includes an uplink period in which the sensor controller is configured to transmit the uplink signal having a first frequency to the input device through the input sensor and a downlink period in which the sensor controller is configured to receive a downlink signal having a second frequency from the input device through the input sensor. The second frequency is different from the transmission frequency.

According to some embodiments, the display device further includes a power controller configured to transmit a power control signal to the wireless power supply. The power controller is configured to receive a power control auxiliary signal from the sensor controller, and the power control auxiliary signal includes recognition information on a presence or absence of the input device and input information on whether or not the sensor controller receives the downlink signal.

According to some embodiments, the power controller is configured to determine whether to supply the wireless power signal based on the recognition information and to determine a length of the power supply period based on the input information.

According to some embodiments, the wireless power supply is configured to operate in a first charging mode in which the wireless power signal is transmitted to the input device during the power supply period that does not overlap the input sensing period and in a second charging mode in which the wireless power signal is transmitted to the input device during the power supply period that partially overlaps the input sensing period.

According to some embodiments, the downlink period overlaps the power supply period in the second charging mode.

According to some embodiments, the wireless power supply is configured to operate in the first charging mode in response to a distance between the display device and the input device being equal to or smaller than a first communication distance and to operate in the second charging mode in response to the distance between the display device and the input device being greater than the first communication distance and equal to or smaller than a second communication distance. The first communication distance is defined as a distance where the sensor controller receives the downlink signal from the input device through the input sensor, and the second communication distance is defined as a distance where the sensor controller transmits the uplink signal to the input device through the input sensor.

According to some embodiments, the wireless power supply is configured to operate in the second charging mode in response to the distance between the display device and the input device being equal to or smaller than the first communication distance and the sensor controller does not receive the downlink signal from the input device through the input sensor.

According to some embodiments, the wireless power supply includes a conductive coil.

Aspects of some embodiments of the inventive concept include an electronic device including a display panel including a display area at which an image is displayed, an input sensor on the display panel and configured to operate in a first mode to sense a first input or in a second mode to sense a second input, a sensor controller configured to control an operation of the input sensor, an input device configured to provide the second input to the input sensor, and a wireless power supply configured to transmit a wireless power signal to the input device at a transmission frequency in response to the input sensor operating in the second mode. The sensor controller is configured to transmit an uplink signal having a first frequency to the input device through the input sensor in the second mode, and the uplink signal includes a set signal corresponding to the transmission frequency of the wireless power signal.

According to some embodiments, the input device includes a communicator configured to receive the uplink signal and to transmit a downlink signal having a second frequency to the sensor controller through the input sensor, a power receiver configured to receive the wireless power signal, and a controller configured to receive the set signal and to control an operation of the communicator and the power receiver.

According to some embodiments, the input device further includes a power storage charged with a power by the wireless power signal, and the power receiver is configured to generate the power in response to the wireless power signal and to supply the power to the power storage.

According to some embodiments, the sensor controller is configured to sense the first input through the input sensor during a first input sensing frame and to sense the second input through the input sensor during a second input sensing frame, and the wireless power supply is configured to transmit the wireless power signal to the input device during a power supply frame. The second input sensing frame includes an input sensing period in which the sensor controller is configured to sense the second input through the input sensor and a pause period in which the sensor controller is configured to not sense the second input through the input sensor. The power supply frame includes a power supply period in which the wireless power signal is transmitted to the input device through the wireless power supply at the transmission frequency, the pause period overlaps the power supply period, and the second frequency is different from the transmission frequency.

According to some embodiments, the input sensing period includes an uplink period in which the sensor controller is configured to transmit the uplink signal to the input device through the input sensor and a downlink period in which the sensor controller is configured to receive a downlink signal from the input device through the input sensor. The wireless power supply is configured to operate in a first charging mode in which the wireless power signal is transmitted to the input device during the power supply period that does not overlap the input sensing period and in a second charging mode in which the wireless power signal is transmitted to the input device during the power supply period that overlaps the downlink period.

According to some embodiments, the wireless power supply is configured to operate in the first charging mode in response to a distance between the display device and the input device being smaller than a first communication distance and to operate in the second charging mode in response to the distance between the display device and the input device being greater than the first communication distance and smaller than a second communication distance. The first communication distance is a distance where the sensor controller receives the downlink signal from the input device through the input sensor, and the second communication distance is a distance where the sensor controller transmits the uplink signal to the input device through the input sensor.

Aspects of some embodiments of the inventive concept include a display device including a display panel including a display area at which an image is displayed, an input sensor on the display panel and configured to operate in a first mode to sense a first input or in a second mode to sense a second input provided by an input device, a sensor controller configured to control an operation of the input sensor, and a wireless power supply configured to transmit a wireless power signal to the input device in response to the input sensor operating in the second mode. The sensor controller is configured to sense the first input through the input sensor during a first input sensing frame and to sense the second input through the input sensor during a second input sensing frame, and the wireless power supply is configured to transmit the wireless power signal to the input device during a power supply frame. The second input sensing frame includes an input sensing period in which the sensor controller is configured to sense the second input through the input sensor and a pause period in which the sensor controller is configured to not sense the second input through the input sensor. The power supply frame includes a power supply period in which the wireless power signal is transmitted to the input device through the wireless power supply at a transmission frequency, and the pause period overlaps the power supply period.

According to some embodiments, the input sensing period includes an uplink period in which the sensor controller is configured to transmit an uplink signal having a first frequency to the input device through the input sensor and a downlink period in which the sensor controller is configured to receive a downlink signal from the input device through the input sensor. The wireless power supply is configured to transmit the wireless power signal to the input device at the transmission frequency.

According to some embodiments, the wireless power supply is configured to operate in a first charging mode in which the wireless power signal is transmitted to the input device during the power supply period that does not overlap the input sensing period and to operate in a second charging mode in which the wireless power signal is transmitted to the input device during the power supply period that overlaps the downlink period.

According to some embodiments of the present disclosure, a display device may transmit the wireless power signal to the input device while sensing the input provided thereto from the input device. The input device may receive the wireless power signal to be charged with the power while providing the input. Thus, a size of the power storage in which the power required to control the operation of the input device is stored may decrease, and the input device with light weight may be provided.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

Figure 1:
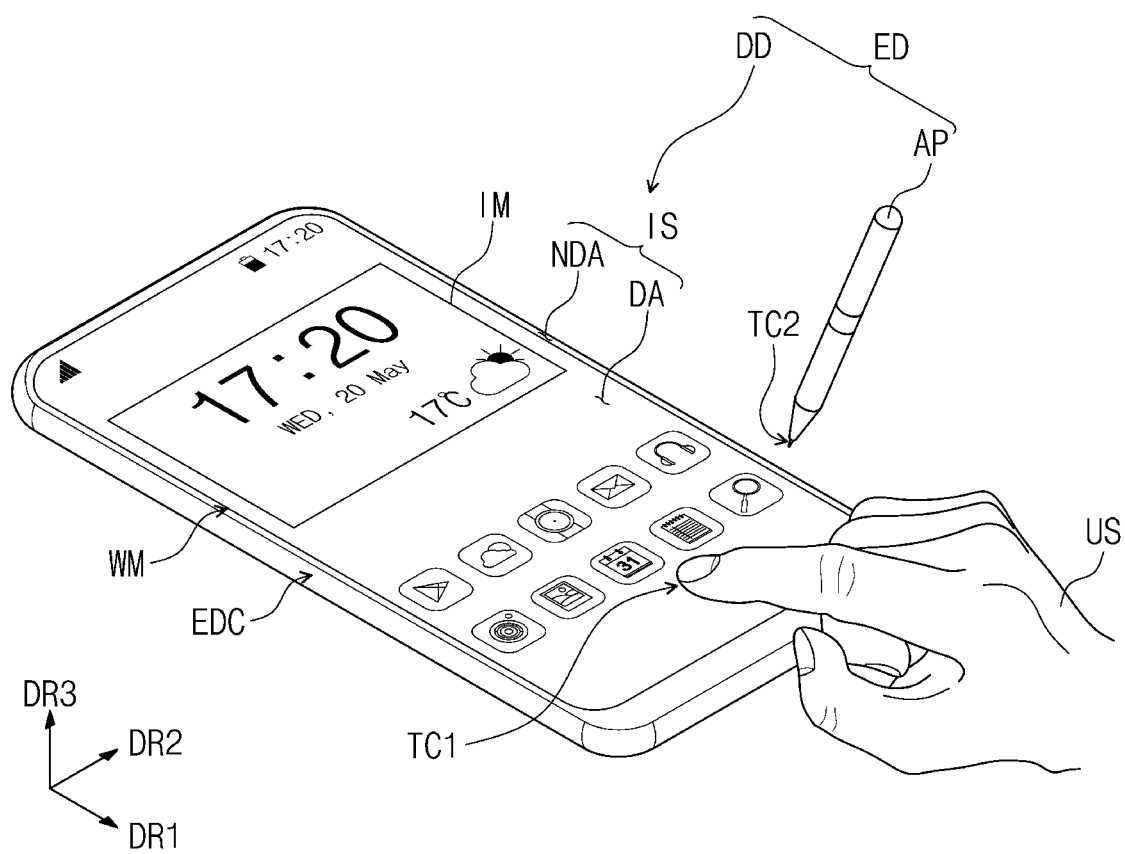
FIG. 1 is a perspective view showing an electronic device according to some embodiments of the present disclosure.

In the present disclosure, it will be understood that when an element or layer is referred to as being "on", "connected to" or "coupled to" another element or layer, it can be directly on, connected or coupled to the other element or layer or intervening elements or layers may be present.

Like numerals refer to like elements throughout. In the drawings, the thickness, ratio, and dimension of components are exaggerated for effective description of the technical content.

As used herein, the term "and/or" includes any and all combinations of one or more of the associated listed items.

It will be understood that, although the terms first, second, etc. may be used herein to describe various elements, components, regions, layers and/or periods, these elements, components, regions, layers and/or periods should not be limited by these terms. These terms are only used to distinguish one element, component, region, layer or period from another region, layer or period. Thus, a first element, component, region, layer or period discussed below could be termed a second element, component, region, layer or period without departing from the teachings of the present disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another element(s) or feature(s) as illustrated in the figures.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, aspects of some embodiments of the present disclosure will be explained in more detail with reference to the accompanying drawings.

Figure 2:
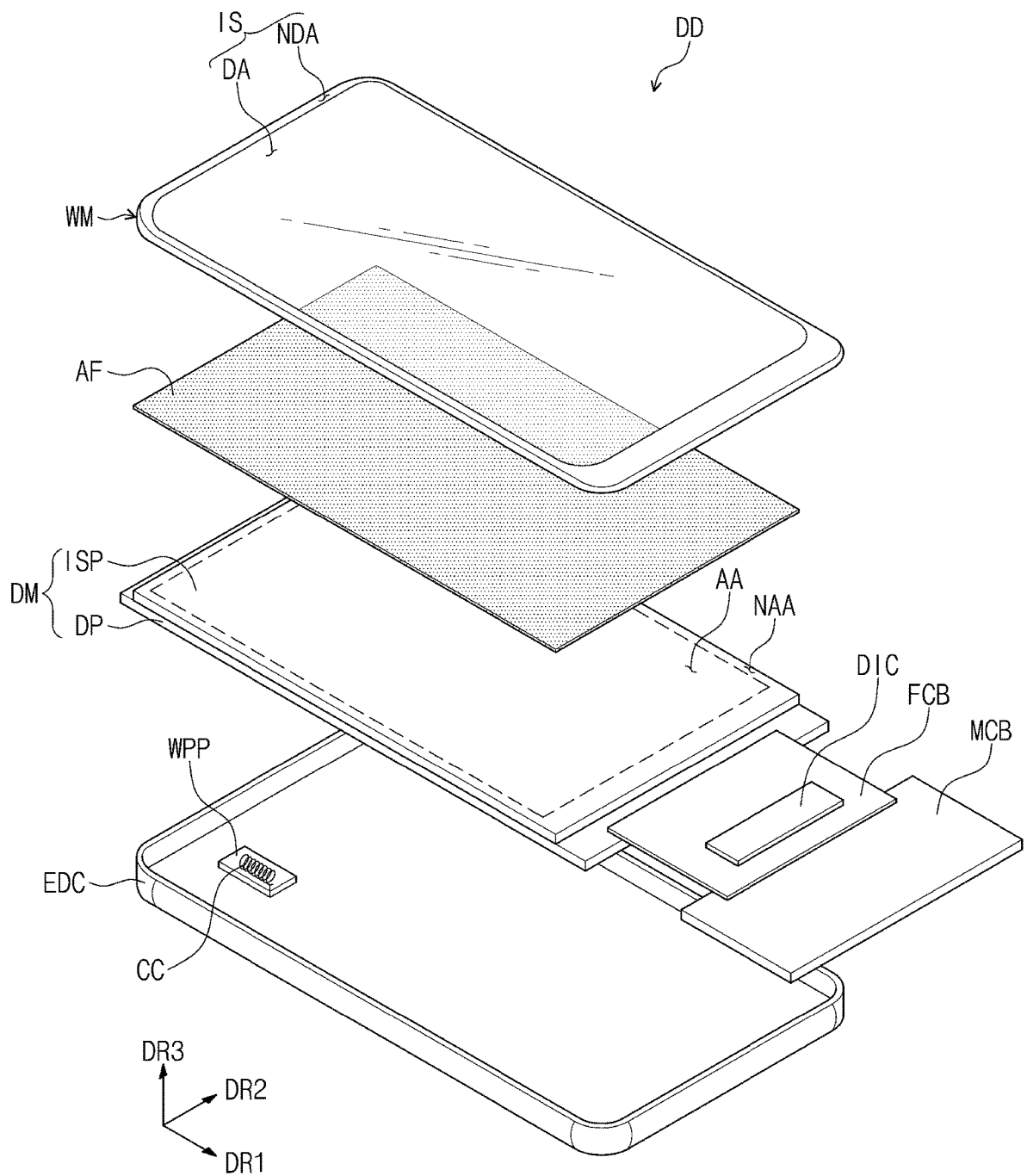
FIG. 2 is an exploded perspective view showing a display device according to some embodiments of the present disclosure.

FIG. 1 is a perspective view showing an electronic device ED according to some embodiments of the present disclosure, and FIG. 2 is an exploded perspective view showing a display device DD according to some embodiments of the present disclosure.

Referring to FIGS. 1 and 2, the electronic device ED includes the display device DD and an input device AP.

The display device DD may be a device activated in response to electrical signals. The display device DD may be applied to various electronic devices. For example, the display device DD may be applied to electronic devices such as a smart watch, a tablet computer, a notebook computer, a computer, a smart television, or the like.

The display device DD may display an image IM toward a third direction DR3 through a display surface IS that is substantially parallel to each of a first direction DR1 and a second direction DR2. That is, the display surface IS may be defined by or parallel to a plane formed by the first direction DR1 and the second direction DR2, and the third direction may be a direction that is perpendicular or normal with respect to the display surface IS. The display surface IS at which the image IM is displayed may correspond to a front surface of the display device DD. The image IM may include a video and a still image.

According to some embodiments, front (or upper) and rear (or lower) surfaces of each member are defined with respect to a direction in which the image IM is displayed. The front and rear surfaces are opposite to each other in the third direction DR3, and a normal line direction of each of the front and rear surfaces may be substantially parallel to the third direction DR3.

A separation distance in the third direction DR3 between the front surface and the rear surface may correspond to a thickness in the third direction DR3 of the display device DD. Meanwhile, the first, second, and third directions DR1, DR2, and DR3 are relative each other and may be changed in other directions.

The display device DD may sense an external input applied thereto from the outside. The external input includes various forms of inputs provided from the outside of the display device DD. The display device DD according to some embodiments of the present disclosure may sense a first input TC1 by a user US, which is applied thereto from the outside. The first input TC1 by the user US may include one of various forms of external inputs, such as a portion of the user's body, light, heat, or pressure, or a combination thereof. In the present embodiment, the first input TC1 by the user US is shown as a touch input by a user's hand applied to the front surface. However, this is merely an example, and the first input TC1 by the user US may be provided in various forms as described above. In addition, the display device DD may sense the first input TC1 by the user US, which is applied to a side or rear surface of the display device DD depending on a structure of the display device DD, and embodiments according to the present disclosure should not be limited to a particular embodiment.

In addition, the display device DD according to some embodiments of the present disclosure may sense a second input TC2 applied thereto from the outside. The second input TC2 may include inputs generated by the input device AP included in the electronic device ED, e.g., a stylus pen, an active pen, a touch pen, an electronic pen, an e-pen, or the like other than the hand of the user US. In the following descriptions, the input generated by the active pen will be described as the second input TC2.

The front surface of the display device DD may include a display area DA displaying the image IM and a non-display area NDA defined around the display area DA. That is, the non-display area NDA may be located in a periphery or outside a footprint of the display area DA. The display area DA may be an area through which images (e.g., the image IM) are displayed, and the non-display area NDA may be a bezel area at which no image is displayed. FIG. 1 shows a structure in which the non-display area NDA is defined to surround the display area DA, however, embodiments according to the present disclosure are not limited thereto or thereby. The non-display area NDA may be defined adjacent to only one side of the display area DA.

As shown in FIG. 2, the display device DD may include a display module DM and a window WM located on the display module DM. The display module DM may include a display panel DP and an input sensor ISP.

The display panel DP according to some embodiments of the present disclosure may be a light-emitting type display panel, however, it should not be particularly limited. For instance, the display panel DP may be an organic light emitting display panel or a quantum dot light emitting display panel. A light emitting layer of the organic light emitting display panel may include an organic light emitting material. A light emitting layer of the quantum dot light emitting display panel may include a quantum dot or a quantum rod. Hereinafter, the organic light emitting display panel will be described as a representative example of the display panel DP.

The input sensor ISP may be located directly on the display panel DP. According to some embodiments, the input sensor ISP may be formed on the display panel DP through successive processes. That is, when the input sensor ISP is located directly on the display panel DP, an adhesive film may not be located between the input sensor ISP and the display panel DP. However, an inner adhesive film may be located between the input sensor ISP and the display panel DP as an example of the present disclosure. In this case, the input sensor ISP is not manufactured together with the display panel DP through the successive processes. That is, the input sensor ISP may be fixed to an upper surface of the display panel DP by the inner adhesive film after being manufactured through a separate process from the display panel DP.

The display panel DP may generate the image, and the input sensor ISP may obtain coordinate information about the external input, e.g., the first and second inputs TC1 and TC2 (refer to FIG. 1).

The window WM may include a transparent material that transmits the image. For example, the window WM may include a glass, sapphire, or plastic material. The window WM may have a single-layer structure, however, embodiments according to the present disclosure are not limited thereto or thereby, and the window WM may include a plurality of layers. The non-display area NDA of the display device DD may be defined by printing a material having a color (e.g., a set or predetermined color) on an area of the window WM. As an example, the window WM may include a light blocking pattern to define the non-display area NDA. The light blocking pattern may be a colored organic layer and may be formed by a coating method.

The window WM may be coupled to the display module DM by an adhesive film AF. As an example, the adhesive film AF may include an optically clear adhesive film (OCA). However, the adhesive film AF should not be limited thereto or thereby, and the adhesive film AF may include a conventional adhesive. For example, the adhesive film AF may include an optically clear resin (OCR) or a pressure sensitive adhesive film (PSA).

An anti-reflective layer may be further located between the window WM and the display module DM. The anti-reflective layer may reduce a reflectance of an external light incident thereto from the above of the window WM. The anti-reflective layer according to some embodiments of the present disclosure may include a retarder and a polarizer. The retarder may be a film type or liquid crystal coating type and may include a λ/2 retarder and/or a λ/4 retarder. The polarizer may be a film type or liquid crystal coating type. The film type polarizer may include a stretching type synthetic resin film, and the liquid crystal coating type polarizer may include liquid crystals aligned in an alignment (e.g., a set or predetermined alignment). The retarder and the polarizer may be implemented as one polarizing film.

The display module DM may display the image in response to electrical signals and may transmit/receive information about the external input. The display module DM may include an active area AA and a peripheral area NAA. The active area AA may be defined as an area through which the image provided from the display module DM transmits.

The peripheral area NAA may be defined adjacent to the active area AA. For example, the peripheral area NAA may surround the active area AA. However, this is merely an example, and the peripheral area NAA may be defined in various shapes and should not be particularly limited. According to some embodiments, the active area AA of the display module DM may correspond to at least a portion of the display area DA.

The display module DM may further include a main circuit board MCB, a flexible circuit film FCB, and a driving chip DIC. The main circuit board MCB may be connected to the flexible circuit film FCB and may be electrically connected to the display panel DP. The main circuit board MCB may include a plurality of driving elements. The driving elements may include a circuit to drive the display panel DP. The flexible circuit film FCB may be connected to the display panel DP and may electrically connect the display panel DP to the main circuit board MCB. The driving chip DIC may be mounted on the flexible circuit film FCB.

The driving chip DIC may include driving elements, for example, a data driving circuit, to drive a pixel of the display panel DP. According to some embodiments of the present disclosure, the display module DM includes one flexible circuit film FCB, however, embodiments according to the present disclosure are not limited thereto or thereby. The flexible circuit film FCB may be provided in plural, and the flexible circuit films FCB may be connected to the display panel DP. FIG. 2 shows a structure in which the driving chip DIC is mounted on the flexible circuit film FCB, however, the present disclosure should not be limited thereto or thereby. For example, the driving chip DIC may be located directly on the display panel DP. In this case, a portion of the display panel DP on which the driving chip DIC is mounted may be bent to be located on a rear surface of the display module DM.

The input sensor ISP may be electrically connected to the main circuit board MCB through the flexible circuit film FCB, however, the embodiments of the present disclosure are not limited thereto or thereby. That is, the display module DM may further include a separate flexible circuit film to electrically connect the input sensor ISP to the main circuit board MCB.

The display device DD may further include a wireless power supply WPP located under the display module DM. When viewed in a plane, the wireless power supply WPP may be arranged to overlap the active area AA. However, as an example, the wireless power supply WPP may be arranged to overlap the active area AA and the peripheral area NAA.

The wireless power supply WPP may include a conductive coil CC. However, the wireless power supply WPP may further include a capacitor in addition to the conductive coil CC. The wireless power supply WPP may transmit a wireless power signal WPS (refer to FIG. 3) to the input device AP using one or more wireless power transfer methods. The wireless power supply WPP may apply the wireless power signal WPS to the input device AP using one or more methods of an inductive coupling method based on an electromagnetic induction phenomenon and an electromagnetic resonance coupling method based on an electromagnetic resonance phenomenon generated by the wireless power signal WPS of a specific frequency.

Figure 3:
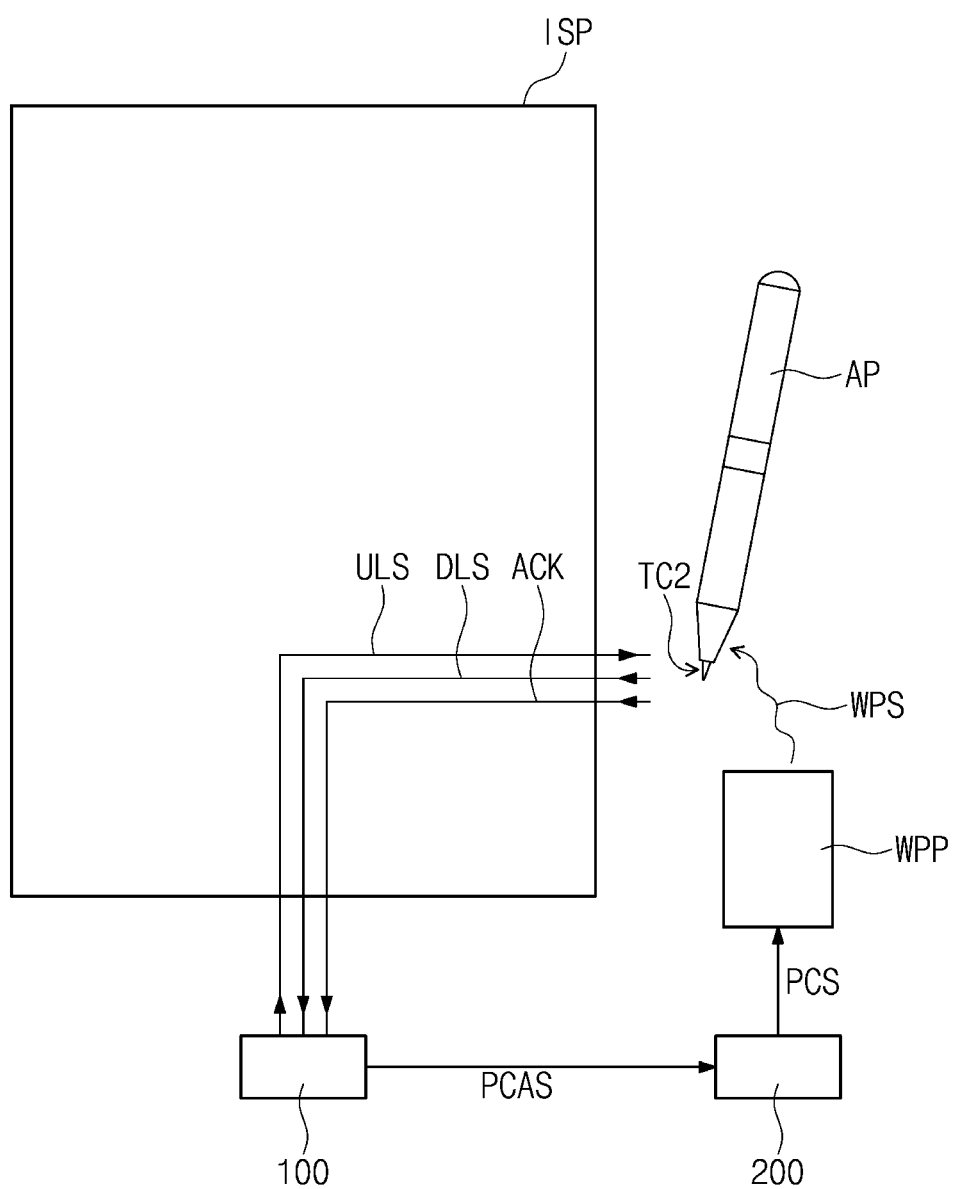
FIG. 3 is a block diagram showing an operation of a display device according to some embodiments of the present disclosure.

The transmission of the wireless power signal WPS by the inductive coupling method may be performed to transfer the power wirelessly using the conductive coil CC included in the wireless power supply WPP and a conductive coil of a power receiver PRP (refer to FIG. 5) included in the input device AP (refer to FIG. 3). The transmission of the wireless power signal WPS by the inductive coupling method may be performed when two conductive coils are configured such that a change in a magnetic field of one coil induces a current to the other coil by an electromagnetic induction, thereby transferring the electric power.

In the transmission of the wireless power signal WPS by the electromagnetic resonance coupling method, the wireless power signal WPS is transferred to the input device AP at a specific frequency that is determined by an inductance of the conductive coil CC and a capacitance of a capacitor included in the wireless power supply WPP. The input device AP may control an operation of the power receiver PRP based on the specific frequency of the wireless power signal WPS transmitted by the wireless power supply WPP and may receive the wireless power signal WPS. The power receiver PRP may receive the wireless power signal WPS and may generate a power PW (refer to FIG. 5). In this case, the specific frequency may be a resonant frequency, and the wireless power signal WPS may be transferred to the power receiver PRP of the input device AP from the wireless power supply WPP due to a resonance phenomenon.

Hereinafter, for the convenience of explanation, aspects of some embodiments of the present disclosure are described under the assumption that the wireless power supply WPP transmits the wireless power signal WPS to the input device AP by the electromagnetic resonance coupling method.

The display device DD may further include an external case EDC accommodating the display module DM and the wireless power supply WPP. The external case EDC may be coupled to the window WM and may define an appearance of the display device DD. The external case EDC may absorb impacts applied thereto from the outside and may prevent or reduce instances of foreign substances, moisture, or other contaminants entering the display module DM to protect components accommodated in the external case EDC. Meanwhile, as an example, the external case EDC may be provided in a form in which a plurality of storage members is combined with each other.

The display device DD according to some embodiments may further include an electronic module including various functional modules to operate the display module DM, a power supply module supplying a power required for an overall operation of the display device DD, and a bracket coupled to the display module DM and/or the external case EDC to divide an inner space of the display device DD.

Figure 4:
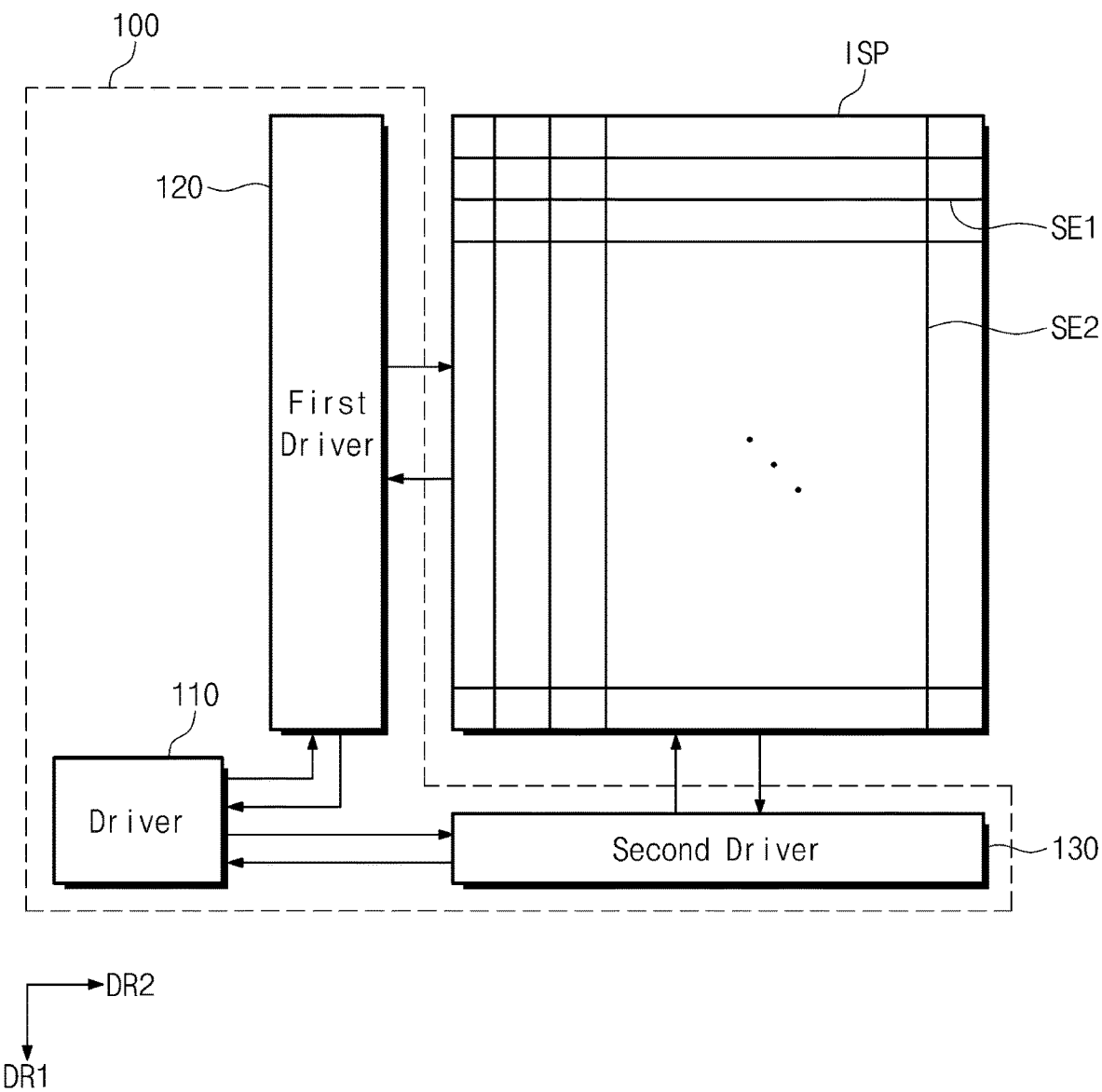
FIG. 4 is a block diagram showing a sensor controller and an input sensor according to some embodiments of the present disclosure.

FIG. 3 is a block diagram showing an operation of a display device according to some embodiments of the present disclosure, and FIG. 4 is a block diagram showing a sensor controller 100 and an input sensor ISP according to some embodiments of the present disclosure.

Referring to FIGS. 2, 3, and 4, the display device DD according to some embodiments of the present disclosure may further include the sensor controller 100 to control an operation of the input sensor ISP and a power controller 200 connected to the wireless power supply WPP.

The sensor controller 100 may be mounted on the main circuit board MCB. However, as another way, the sensor controller 100 may be built in the driving chip DIC.

The input sensor ISP may include first sensing electrodes SE1 and second sensing electrodes SE2 arranged to be electrically insulated from the first sensing electrodes SE1. The first sensing electrodes SE1 may extend in the second direction DR2 and may be arranged in the first direction DR1 substantially perpendicular to the second direction DR2. The second sensing electrodes SE2 may extend in the first direction DR1 and may be arranged in the second direction DR2. The first sensing electrodes SE1 and the second sensing electrodes SE2 may cross each other and may be capacitively coupled to each other by the cross portions.

FIG. 4 shows a structure in which each of the first and second sensing electrodes SE1 and SE2 has a bar shape as a representative example, however, embodiments according to the present disclosure are not limited thereto or thereby. For example, each of the first and second sensing electrodes SE1 and SE2 may include a plurality of mesh lines.

The sensor controller 100 may include a first driver 120 connected to the first sensing electrodes SE1 of the input sensor ISP and a second driver 130 connected to the second sensing electrodes SE2 of the input sensor ISP. The sensor controller 100 may further include a driver 110 that controls a drive of the first and second drivers 120 and 130.

The sensor controller 100 may operate the input sensor ISP in a first mode to sense the first input TC1 (refer to FIG. 1) or may operate the input sensor ISP in a second mode to sense the second input TC2 provided by the input device AP. The sensor controller 100 may communicate with the input device AP through the input sensor ISP to sense the second input TC2.

The sensor controller 100 may transmit an input sensing signal to the input sensor ISP to recognize the input device AP. In a case where the input device AP is not recognized through the input sensor ISP, the sensor controller 100 may operate the input sensor ISP in the first mode. In a case where the input device AP is recognized through the input sensor ISP, the sensor controller 100 may operate the input sensor ISP in the second mode. As an example, when the input device AP is recognized through the input sensor ISP, the sensor controller 100 may control the input sensor ISP to be operated in the second mode even though the first input TC1 of the user US (refer to FIG. 1) exists.

The sensor controller 100 may transmit an uplink signal ULS to the input device AP through the input sensor ISP. In this case, the uplink signal ULS may have a first frequency F1 (refer to FIG. 9A). The input sensing signal may be included in the uplink signal ULS. In a case where the input device AP is located within a distance that is able to receive the uplink signal ULS, the input device AP may transmit an acknowledgement signal ACK to the sensor controller 100 through the input sensor IPS in response to the uplink signal ULS.

When the sensor controller 100 receives the acknowledgement signal ACK, the sensor controller 100 controls the input sensor ISP to be operated in the second mode to sense the second input TC2. The sensor controller 100 may receive a downlink signal DLS from the input device AP through the input sensor ISP. In this case, the downlink signal DLS may have a second frequency F2 (refer to FIG. 9A).

The wireless power supply WPP may transmit the wireless power signal WPS to the input device AP when the input sensor ISP is operated in the second mode. In this case, the wireless power signal WPS may have a transmission frequency TF (refer, e.g., to FIG. 9A).

The sensor controller 100 may transmit a set signal SS (refer, e.g., to FIG. 5) corresponding to the transmission frequency TF of the wireless power signal WPS to the input device AP through the input sensor ISP. As an example, the set signal SS may be included in the uplink signal ULS.

The power controller 200 may receive a power control auxiliary signal PCAS from the sensor controller 100 and may generate a power control signal PCS based on the power control auxiliary signal PCAS. The power controller 200 may transmit the generated power control signal PCS to the wireless power supply WPP. The power control auxiliary signal PCAS may include recognition information on whether the input device AP exists and input information on whether the sensor controller 100 receives the downlink signal DLS. The power controller 200 may determine whether to transmit the wireless power signal WPS based on the recognition information and may determine a length of a power supply period during which the wireless power signal WPS is transmitted based on the input information.

As an example, in a case where information that the input device AP exists are included in the recognition information, the power controller 200 may allow the wireless power supply WPP to transmit the wireless power signal WPS to the input device AP. In addition, in a case where information that the sensor controller 100 receives the downlink signal DLS from the input device AP are included in the input information, the power controller 200 may allow the wireless power supply WPP to operate in a first charging mode, which will be described later. On the other hand, in a case where information that the sensor controller 100 does not receive the downlink signal DLS from the input device AP are included in the input information, the power controller 200 may allow the wireless power supply WPP to operate in a second charging mode, which will be described later. The power controller 200 may generate the power control signal PCS that controls the operation of the wireless power supply WPP based on the power control auxiliary signal PCAS and may transmit the power control signal PCS to the wireless power supply WPP.

Figure 5:
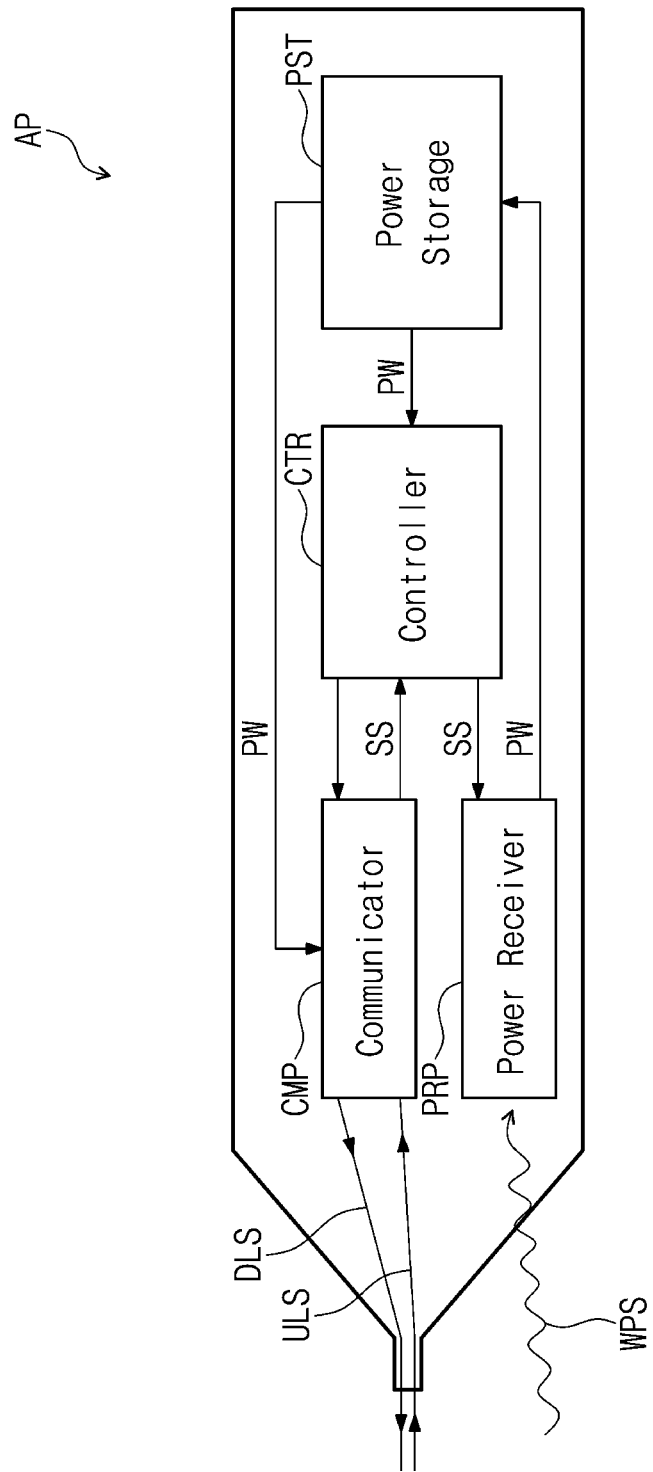
FIG. 5 is a block diagram showing an input device according to some embodiments of the present disclosure.

FIG. 5 is a block diagram showing the input device AP according to some embodiments of the present disclosure.

Referring to FIGS. 3 and 5, the input device AP may include a communicator CMP, the power receiver PRP, a controller CTR, and a power storage PST.

The input device AP may have a pen shape and may be provided with an accommodating space defined therein. The input device AP may further include a conductive tip protruded outward from one side of the input device AP. The conductive tip of the input device AP may be in direct contact with the input sensor ISP.

The communicator CMP may include a receiving circuit that receives the uplink signal ULS of the first frequency F1 (refer to FIG. 9A) from the sensor controller 100 through the sensor ISP and a transmitting circuit that transmits the downlink signal DLS of the second frequency F2 (refer to FIG. 9A) to the sensor controller 100 through the input sensor ISP. The transmitting circuit may transmit the acknowledgement signal ACK to the sensor controller 100 through the input sensor IPS in response to the uplink signal ULS.

The communicator CMP may determine the second frequency F2 of the downlink signal DLS based on information such as a protocol version included in the received uplink signal ULS. The downlink signal DLS may include coordinate information of the second input TC2 and information such as an intensity of the second input TC2 and a slope of the input device AP.

The controller CTR may control an operation of the communicator CMP and the power receiver PRP. The controller CTR may receive the set signal SS included in the uplink signal ULS from the communicator CMP. The controller CTR may receive the power PW from the power storage PST. The controller CTR may transmit the set signal SS to the power receiver PRP and may transmit a communication control signal CCS to the communicator CMP.

The power receiver PRP may receive the wireless power signal WPS from the wireless power supply WPP. The power receiver PRP may receive the wireless power signal WPS to generate the power PW and may supply the generated power PW to the power storage PST. The power receiver RPR may include the conductive coil and the capacitor. However, according to some embodiments, the power receiver PRP may supply the generated power PW to the controller CTR.

The controller CTR may control the specific frequency, which is determined by the conductive coil and the capacitor included in the power receiver PRP, to be the same as the transmission frequency TF (refer, e.g., to FIG. 9A) based on the set signal SS corresponding to the transmission frequency TF of the wireless power signal WPS. In this case, the power receiver PRP of the input device AP may receive the wireless power signal WPS transmitted at the transmission frequency TF from the wireless power supply WPP due to the resonance phenomenon. As an example, the uplink signal ULS including the set signal SS may be transmitted to the input device AP through the input sensor ISP. Because the intensity of the uplink signal ULS generated by using the input sensor ISP is limited, the input device AP may not receive the uplink signal ULS when the input device AP is outside a certain distance (e.g., a predetermined or known distance) from the display device DD. However, the wireless power signal WPS may be transmitted to the input device AP through the wireless power supply WPP by the electromagnetic resonance coupling method. Accordingly, even when the input device AP is physically separated from the display device DD by a distance that may not enable the input sensor ISP to receive signals (e.g., the uplink signal ULS) directly with the input device AP, the input device AP may receive the wireless power signal WPS through the wireless power supply WPP. The input device AP may receive the uplink signal ULS and a circuit of the power receiver PRP may be set to have the same specific frequency as that of the transmission frequency TF based on the set signal SS included in the uplink signal ULS. Then, even though the input device AP is located outside the certain distance from the display device DD and does not receive the uplink signal ULS, the power receiver PRP that is previously set to have a specific frequency may receive the wireless power signal WPS transmitted from the wireless power supply WPP at the transmission frequency TF and may generate the power PW.

However, embodiments according to the present disclosure are not limited to the electromagnetic resonance coupling method. In a case where the wireless power supply WPP transmits the wireless power signal WPS using the inductive coupling method, the power receiver PRP may receive the wireless power signal WPS by the electromagnetic induction phenomenon even though the controller CTR does not control the circuit of the power receiver PRP to have the specific frequency.

The power storage PST may receive the power PW from the power receiver PRP and may supply the power PW to the controller CTR and the communicator CMP. For the operation of the input device AP, the power storage PST is required to continuously supply the power PW to the controller CTR and the communicator CMP at a constant level. According to related art systems, the power storage PST may not be charged with the power PW while the input device AP applies the second input TC2 to the display device DD (refer to FIG. 1). Accordingly, as a size and a capacity of the power storage PST may not be reduced, there is a limit to the reduction in weight of the input device AP. However, in a case where the input device AP receives the wireless power signal WPS from the wireless power supply WPP through the power receiver PRP and the power receiver PRP generates the power PW and supplies the power PW to the power storage PST while the input device AP applies the second input TC2 to the display device DD, the power storage PST may be charged with the power PW. Accordingly, the size and the capacity of the power storage PST may be reduced, and thus, the weight of the input device AP may be reduced.

Figure 6A:
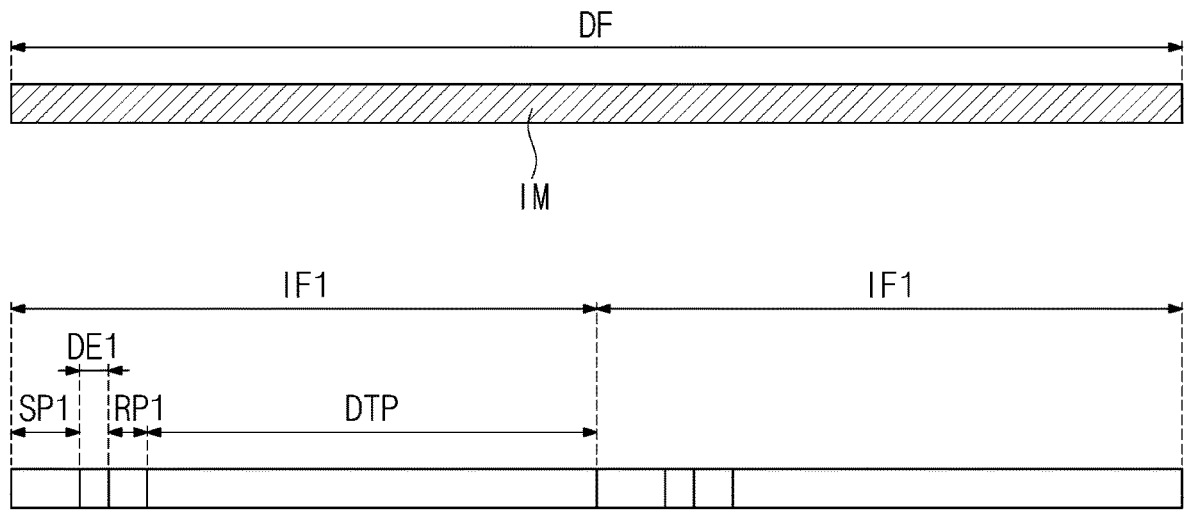
FIG. 6A is a view showing an operation of a sensor controller in a first input sensing frame according to some embodiments of the present disclosure.
Figure 6B:
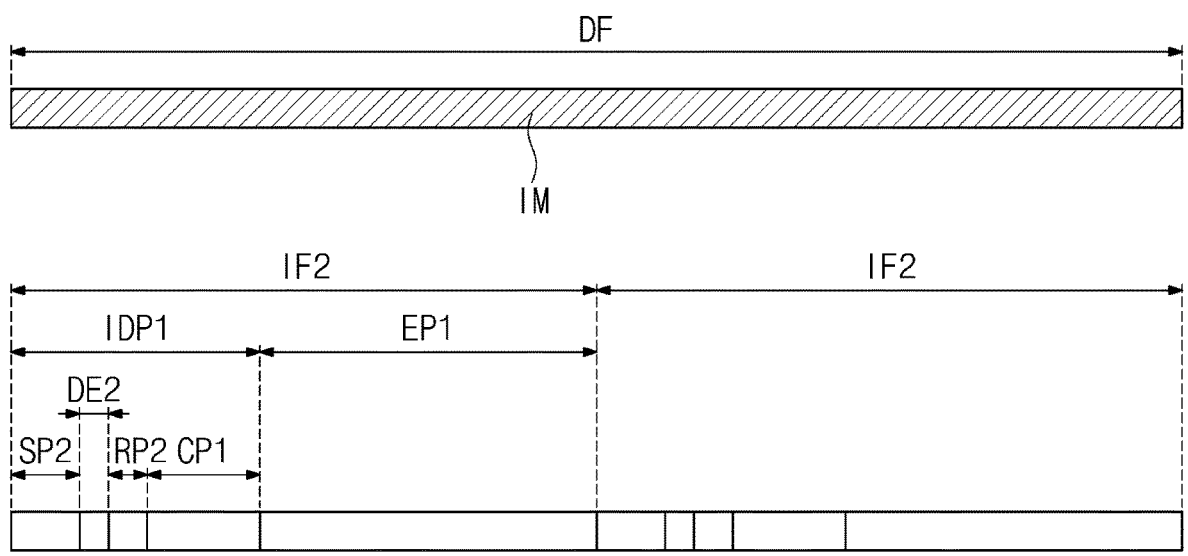
FIG. 6B is a view showing an operation of a sensor controller in a second input sensing frame according to some embodiments of the present disclosure.
Figure 6C:
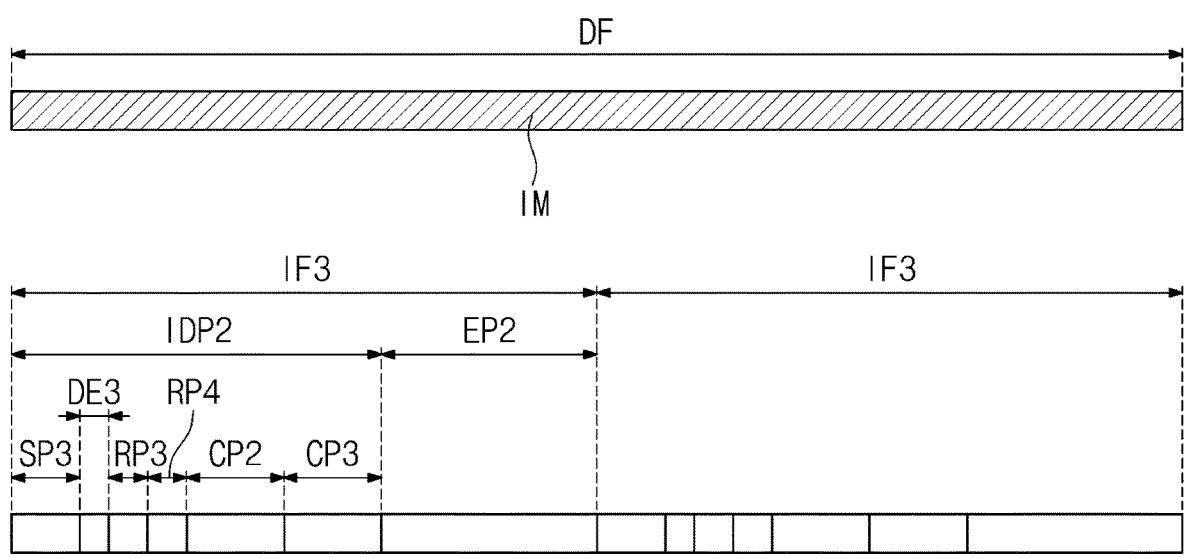
FIG. 6C is a view showing an operation of a sensor controller in a third input sensing frame according to some embodiments of the present disclosure.

FIG. 6A is a view showing an operation of the sensor controller in a first input sensing frame according to some embodiments of the present disclosure. FIG. 6B is a view showing an operation of the sensor controller in a second input sensing frame according to some embodiments of the present disclosure. FIG. 6C is a view showing an operation of the sensor controller in a third input sensing frame according to some embodiments of the present disclosure.

Referring to FIGS. 1, 2, 3 and 6A, the display device DD may display the image IM through the display panel DP. The display panel DP may display the image IM in the unit of one display frame DF. When the operating frequency of the display panel DP is about 60 Hz, a time corresponding to the one display frame DF may be about 16.67 ms.

The display device DD may sense the first input TC1 and the second input TC2 through the input sensor ISP while displaying the image IM through the display panel DP. The input sensor ISP may operate in the first mode to sense the first input TC1 or in the second mode to sense the second input TC2 depending on the presence or absence of the input device AP. In detail, when the input device AP is not recognized, the input sensor ISP may operate in the first mode, and when the input device AP is recognized, the input sensor ISP may operate in the second mode.

As an example, the operating frequency of the input sensor ISP may be equal to or greater than the operating frequency of the display panel DP in the first and second modes. For example, when the operating frequency of the display panel DP is about 60 Hz, the operating frequency of the input sensor ISP may be about 120 Hz. When the input sensor ISP operates in the first mode, the input sensor ISP may sense the first input TC1 in the unit of one first input sensing frame IF1, and when the input sensor ISP operates in the second mode, the input sensor ISP may sense the second input TC2 in the unit of one second input sensing frame IF2. According to some embodiments, when assuming that the input sensor ISP operates at the operating frequency of about 120 Hz, a time corresponding to each of the first and second input sensing frames IF1 and IF2 may be about 8.33 ms.

Referring to FIG. 6A, as an example, the input sensor ISP may operate in the first mode during the first input sensing frame IF1 and may sense the first input TC1. As an example, when the input sensor ISP operates in the first mode, the input sensor ISP may sense the first input TC1 in the self-capacitance mode and the mutual capacitance mode. In the self-capacitance mode, the first and second sensing electrodes SE1 and SE2 (refer to FIG. 4) of the input sensor ISP may be integrated in one sensing electrode and may sense the first input TC1. In the mutual capacitance mode, the first sensing electrodes SE1 and the second sensing electrodes SE2 of the input sensor ISP may be capacitively coupled to each other and may sense the first input TC1.

The first input sensing frame IF1 may include a first sensing period SP1 and a detection period DTP. As an example, the input sensor ISP may recognize the input device AP in the first sensing period SP1 and may sense the first input TC1 in at least one mode of the self-capacitance mode and the mutual capacitance mode during the detection period DTP. As an example, the detection period DTP may be behind the first sensing period SP1 in the first input sensing frame IF1. In addition, a time width of the detection period DTP may be larger than that of the first sensing period SP1.

The sensor controller 100 may transmit the input sensing signal to the input sensor ISP during the first sensing period SP1. The input sensing signal is a signal to recognize the input device AP.

The first input sensing frame IF1 may further include a first response period RP1 located between the first sensing period SP1 and the detection period DTP and receiving an integrated acknowledgement signal from the input sensor ISP. The integrated acknowledgement signal may include the acknowledgement signal ACK transmitted by the input device AP in response to the input sensing signal. As an example, when the integrated acknowledgement signal does not include the acknowledgement signal ACK, the sensor controller 100 may operate the input sensor ISP in the first mode.

As an example, a first delay period DE1 may be located between the first sensing period SP1 and the first response period RP1. That is, the first response period RP1 may be separated from the first sensing period SP1 by the first delay period DE1 in time.

When the input sensor ISP operates in the first mode, the sensor controller 100 may sense the first input TC1 in at least one mode of the self-capacitance mode and the mutual capacitance mode during the detection period DTP. As an example, when the sensor controller 100 senses the first input TC1 in the mutual capacitance mode, the sensor controller 100 may transmit a sensing transmission signal to the first sensing electrodes SE1 of the input sensor ISP and may receive a sensing reception signal from the second sensing electrodes SE2.

Referring to FIGS. 1, 2, 3 and 6B, the input sensor ISP may operate in the second mode during the second input sensing frame IF2. The second input sensing frame IF2 may include a first input sensing period IDP1 and a first pause period EP1. The first input sensing period IDP1 may be defined as a period in which the sensor controller 100 senses the second input TC2 through the input sensor ISP. The first pause period EP1 may be defined as a period in which the sensor controller 100 does not sense the second input TC2 through the input sensor ISP. The first input sensing period IDP1 may include a second sensing period SP2 and a first communication period CP1.

The sensor controller 100 may transmit the input sensing signal to the input sensor ISP for the second sensing period SP2 to recognize the input device AP. The second sensing period SP2 in the second input sensing frame IF2 may be defined as a period to recognize the input device AP.

The sensor controller 100 may transmit the uplink signal ULS to the input device AP for the second sensing period SP2 through input sensor ISP. The second sensing period SP2 may be an uplink period. The input sensing signal may be included in the uplink signal ULS. The uplink signal ULS may further include information, such as the size of the display panel DP, the operating frequency of the display panel DP, the protocol version, and the like.

The sensor controller 100 may receive the downlink signal DLS from the input device AP for the first communication period CP1 through the input sensor ISP.

The first communication period CP1 may be a downlink period. The downlink signal DLS may include information such as coordinate information of the second input TC2 provided by the input device AP, intensity of the second input TC2, the slope of the input device AP, and the like. The sensor controller 100 may sense the second input TC2 input through the input device AP via the downlink signal DLS. That is, the first communication period CP1 in the second input sensing frame IF2 may be defined as a period in which the second input TC2 from the input device AP is sensed.

The second input sensing frame IF2 may further include a second response period RP2 located between the second sensing period SP2 and the first communication period CP1 during which the acknowledgement signal ACK from the input device AP is received. The acknowledgement signal ACK may include recognition information on the presence or absence of the input device AP.

A second delay period DE2 may be located between the second sensing period SP2 and the second response period RP2. That is, the second response period RP2 may be separated from the second sensing period SP2 by the second delay period DE2 in time.

Referring to FIGS. 1, 2, 3 and 6C, as an example, the electronic device ED may include two input devices, and the input sensor ISP may operate in a third mode to sense third and fourth inputs respectively provided by the two input devices during a third input sensing frame IF3. The third input sensing frame IF3 may include a second input sensing period IDP2 and a second pause period EP2. The second input sensing period IDP2 may be defined as a period in which the sensor controller 100 senses the third and fourth inputs through the input sensor ISP. The second pause period EP2 may be defined as a period in which the sensor controller 100 does not sense the third and fourth inputs through the input sensor ISP.

The second input sensing period IDP2 may include a third sensing period SP3, a second communication period CP2, and a third communication period CP3.

The sensor controller 100 may transmit the input sensing signal to the input sensor ISP during the third sensing period SP3 to sense the two input devices. The third sensing period SP3 in the third input sensing frame IF3 may be defined as a period to recognize two input devices.

The sensor controller 100 may transmit the uplink signal ULS to the two input devices during the third sensing period SP3 through the input sensor ISP. The input sensing signal may be included in the uplink signal ULS. The uplink signal ULS may further include information such as the size of the display panel DP, the operating frequency of the display panel DP, the protocol version, and the like.

The sensor controller 100 may receive the downlink signal from each of the two input devices through the input sensor ISP during the second communication period CP2 and the third communication period CP3. The downlink signals may include information such as coordinate information of the third and fourth inputs provided by the two input devices, the intensity of the third and fourth inputs, the slope of two input devices, and the like. The sensor controller 100 may sense the third and fourth inputs provided respectively through the two input devices based on the downlink signals. That is, the second and third communication periods CP2 and CP3 in the third input sensing frame IF3 may be defined as periods to sense the third and fourth inputs respectively provided from the two input devices.

The third input sensing frame IF3 may further include third and fourth response periods RP3 and RP4 located between the third sensing period SP3 and the second communication period CP2 and receiving acknowledgement signals respectively from the two input devices. The acknowledgement signals may include recognition information on the presence or absence of the two input devices.

A third delay period DE3 may be located between the third sensing period SP3 and the third response period RP3.

That is, the third response period RP3 may be separated from the third sensing period SP3 by the third delay period DE3 in time.

Hereinafter, for the convenience of explanation, the electronic device ED will be described as including one input device AP.

Figure 7A:
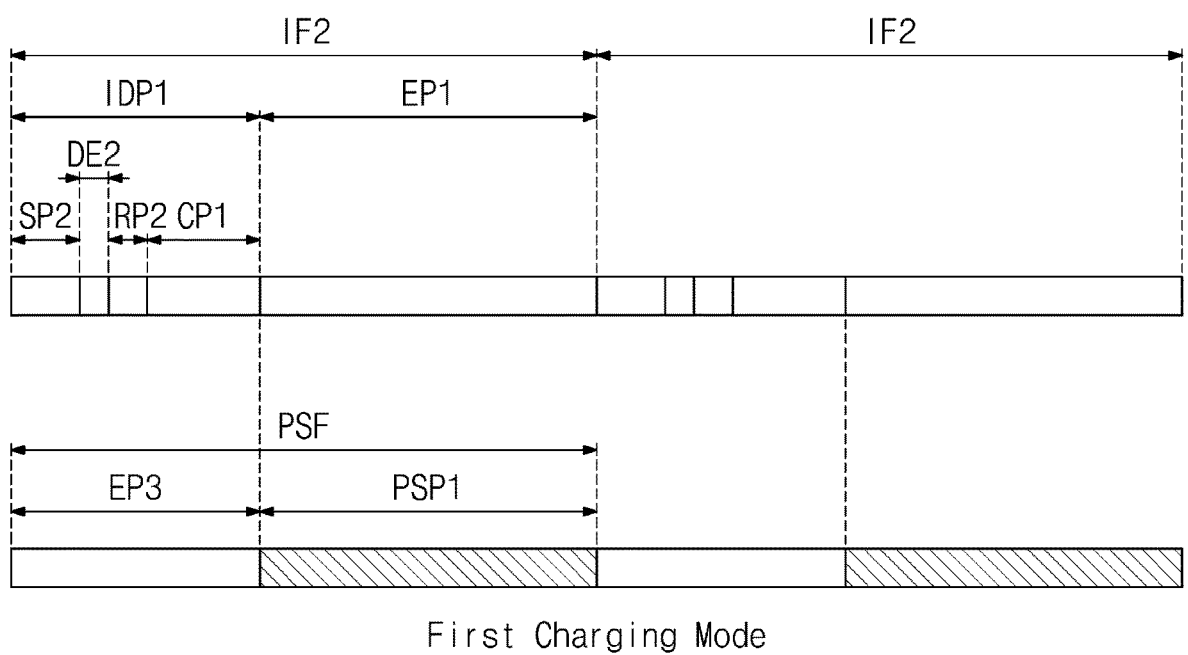
FIG. 7A is a view showing a first charging mode of a wireless power supply according to some embodiments of the present disclosure.
Figure 7B:
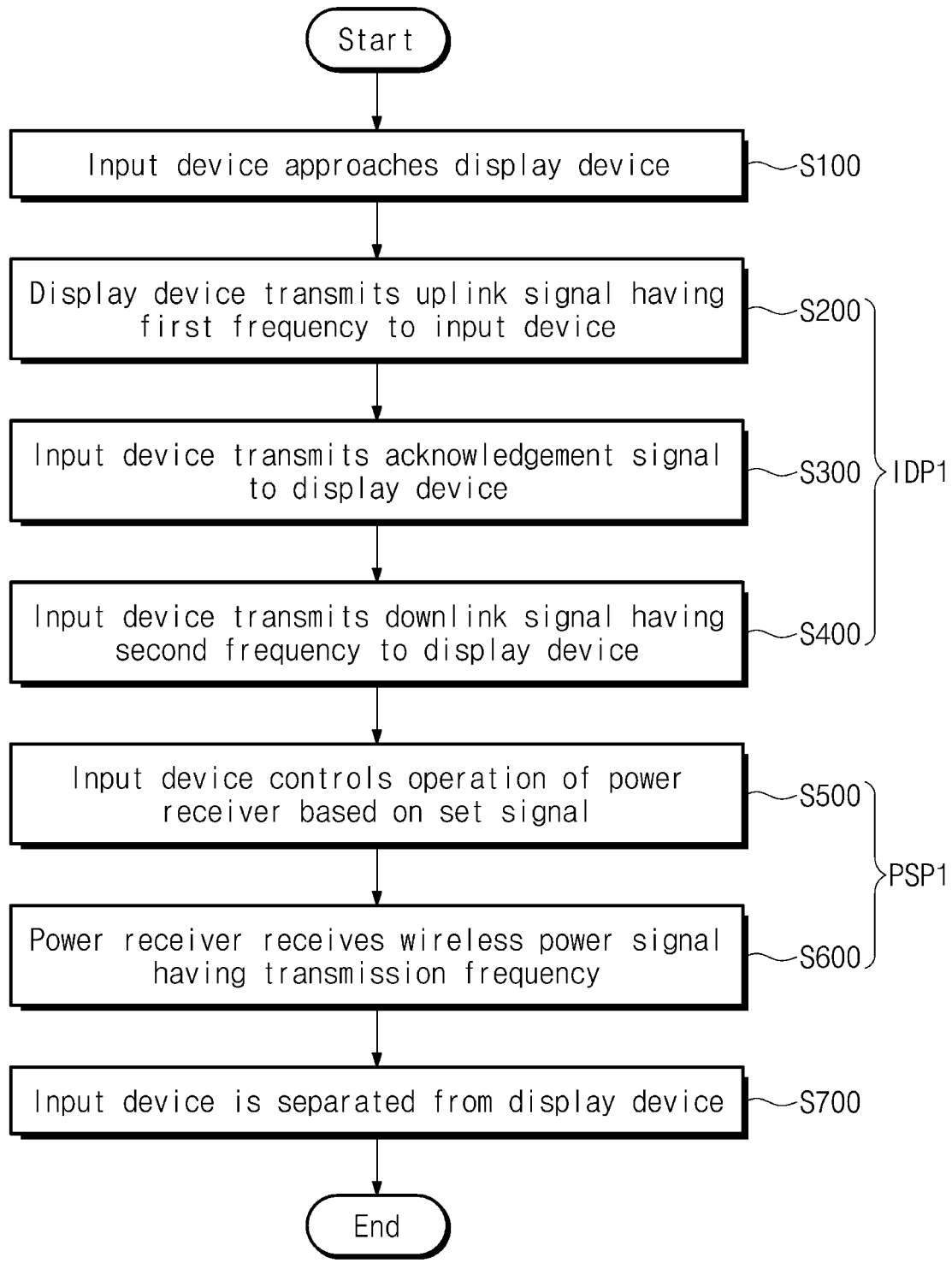
FIG. 7B is a flowchart showing an operation of the wireless power supply in the first charging mode according to some embodiments of the present disclosure.

FIG. 7A is a view showing the first charging mode of the wireless power supply according to some embodiments of the present disclosure. FIG. 7B is a flowchart showing an operation of the wireless power supply in the first charging mode according to some embodiments of the present disclosure.

Referring to FIGS. 3 and 7A, the wireless power supply WPP may transmit the wireless power signal WPS to the input device AP during a power supply frame PSF. The power supply frame PSF may include a first power supply period PSP1 and a third pause period EP3. The first power supply period PSP1 may be defined as a period in which the wireless power supply WPP transmits the wireless power signal WPS to the input device AP. The third pause period EP3 may be defined as a period in which the wireless power supply WPP does not transmit the wireless power signal WPS to the input device AP. The first power supply period PSP1 may overlap the first pause period EP1 of the second input sensing frame IF2. In addition, the first power supply period PSP1 may not overlap the first input sensing period IDP1 of the second input sensing frame IF2.

An operation where the wireless power supply WPP transmits the wireless power signal WPS to the input device AP during the first power supply period PSP1 may be referred to as a first charging mode operation.

The wireless power supply WPP may transmit the wireless power signal WPS to the input device AP during the first power supply period PSP1 at the specific frequency determined by the conductive coil CC (refer to FIG. 2) and the capacitor, which are included in the wireless power supply WPP when being operated in the first charging mode.

Referring to FIGS. 3, 7A, and 7B, when the input device AP approaches the display device DD (S100) (e.g., within a set or predetermined distance or range, defined according to the design of the display device DD and the input device AP), the sensor controller 100 of the display device DD transmits the uplink signal ULS having the first frequency F1 (refer to FIG. 9A) to the input device AP during the second sensing period SP2 included in the first input sensing period IDP1 (S200). In addition, the input device AP transmits the acknowledgement signal ACK to the sensor controller 100 included in the display device DD in response to the uplink signal ULS during the second response period RP2 (S300), and the input device AP transmits the downlink signal DLS having the second frequency F2 (refer to FIG. 9A) to the sensor controller 100 through the input sensor ISP included in the display device DD during the first communication period CP1 (S400). In this case, when the wireless power supply WPP operates in the first charging mode, the input device AP controls the operation of the power receiver PRP (refer to FIG. 5) based on the set signal SS (refer to FIG. 5) during the first power supply period PSP1 overlapping the first pause period EP1 (S500), and the power receiver PRP receives the wireless power signal WPS having the transmission frequency TF (refer to FIG. 9A) (S600). When the input device AP is separated from the display device DD (S700), the wireless power supply WPP stops its operation.

Figure 8A:
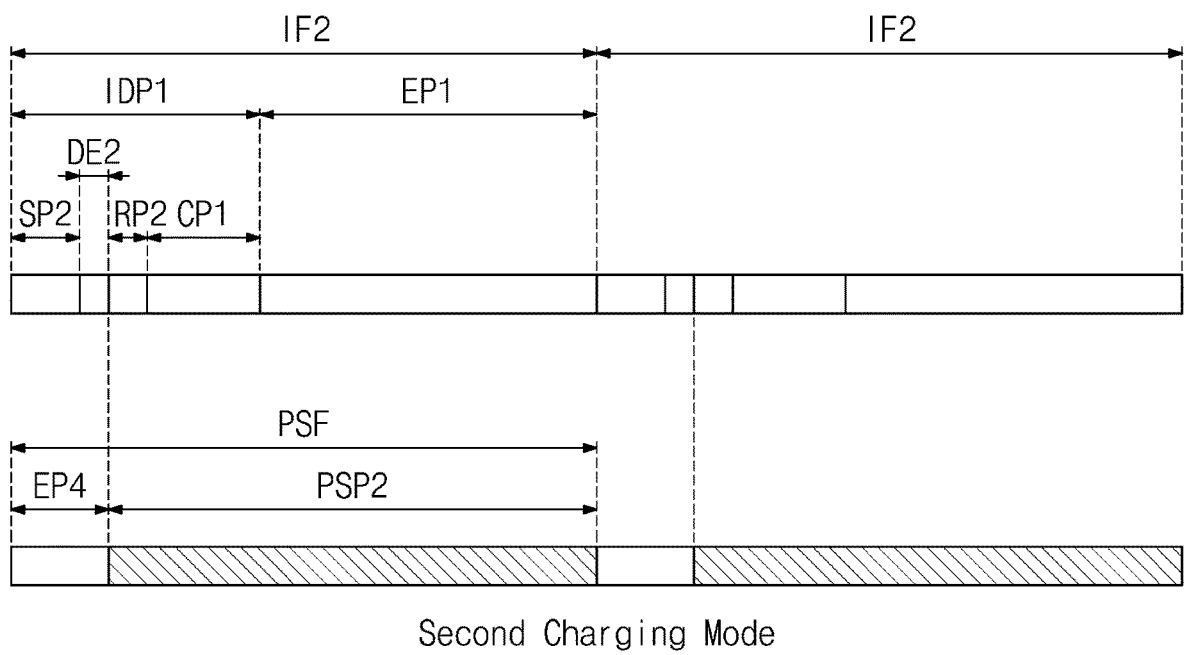
FIG. 8A is a view showing a second charging mode of a wireless power supply according to some embodiments of the present disclosure.
Figure 8B:
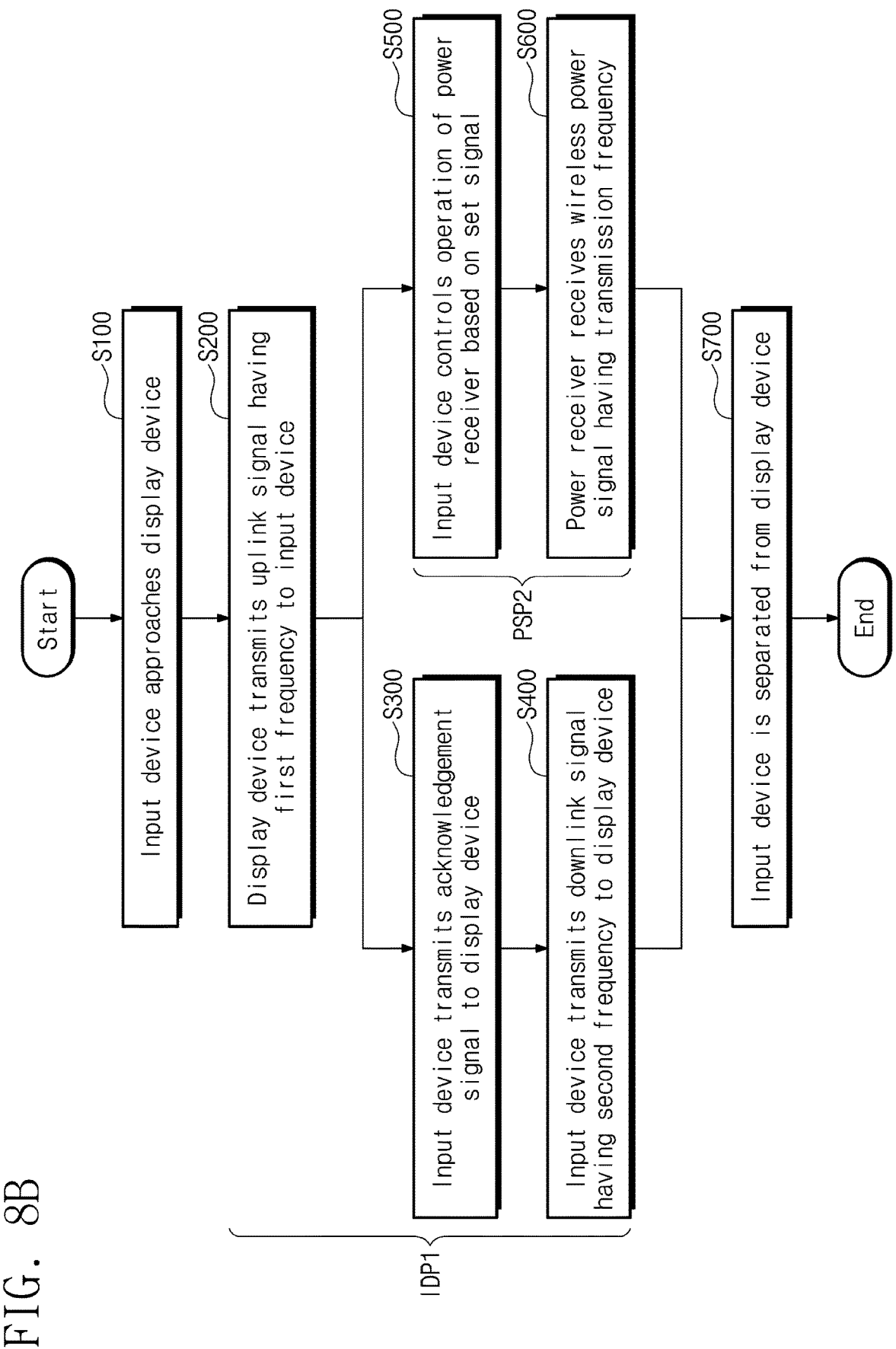
FIG. 8B is a flowchart showing an operation of the wireless power supply in the second charging mode according to some embodiments of the present disclosure.

FIG. 8A is a view showing the second charging mode of the wireless power supply according to some embodiments of the present disclosure, and FIG. 8B is a flowchart showing an operation of the wireless power supply in the second charging mode according to some embodiments of the present disclosure.

Referring to FIGS. 3 and 8A, the power supply frame PSF may include a second power supply period PSP2 and a fourth pause period EP4. The second power supply period PSP2 may be defined as a period in which the wireless power supply WPP transmits the wireless power signal WPS to the input device AP. The fourth pause period EP4 may be defined as a period in which the wireless power supply WPP does not transmit the wireless power signal WPS to the input device AP. The second power supply period PSP2 may overlap the first pause period EP1 of the second input sensing frame IF2. In addition, the second power supply period PSP2 may partially overlap the first input sensing period IDP1 of the second input sensing frame IF2. As an example, the second power supply period PSP2 may overlap the first communication period CP1 of the first input sensing period IDP1. The first communication period CP1 may be the downlink period. An operation where the wireless power supply WPP transmits the wireless power signal WPS to the input device AP during the second power supply period PSP2 is referred to as a second charging mode operation.

As an example, in the second charging mode operation, the second power supply period PSP2 may more overlap the second response period RP2 of the first input sensing period IDP1.

Referring to FIGS. 3, 8A and 8B, when the input device AP approaches the display device DD (S100), the sensor controller 100 of the display device DD transmits the uplink signal ULS having the first frequency F1 (refer to FIG. 9A) to the input device AP during the second sensing period SP2 (S200). In addition, the input device AP transmits the acknowledgement signal ACK to the display device DD during the second response period RP2 in response to the uplink signal ULS (S300). Then, the input device AP transmits the downlink signal DLS having the second frequency F2 (refer to FIG. 9A) to the sensor controller 100 through the input sensor ISP included in the display device DD during the first communication period CP1 (S400). In this case, when the wireless power supply WPP operates in the second charging mode, the input device AP controls the operation of the power receiver PRP (refer to FIG. 5) based on the set signal SS (refer to FIG. 5) during the second power supply period PSP2 overlapping the second response period RP2, the first communication period CP1, and the first pause period EP1 (S500). In addition, the power receiver PRP receives the wireless power signal WPS having the transmission frequency TF (refer to FIG. 9A) (S600). When the input device AP is separated from the display device DD (S700), the wireless power supply WPP stops its operation.

Figure 9A:
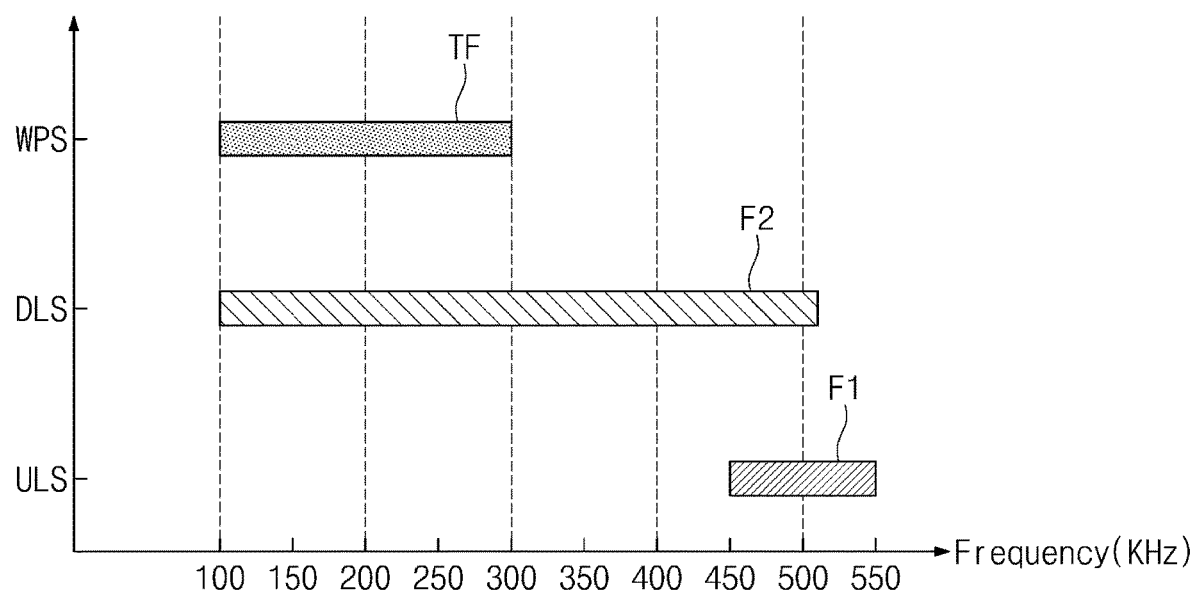
FIGS. 9A to 9C are graphs showing a relationship between a first frequency, a second frequency, and a transmission frequency according to some embodiments of the present disclosure.
Figure 9B:
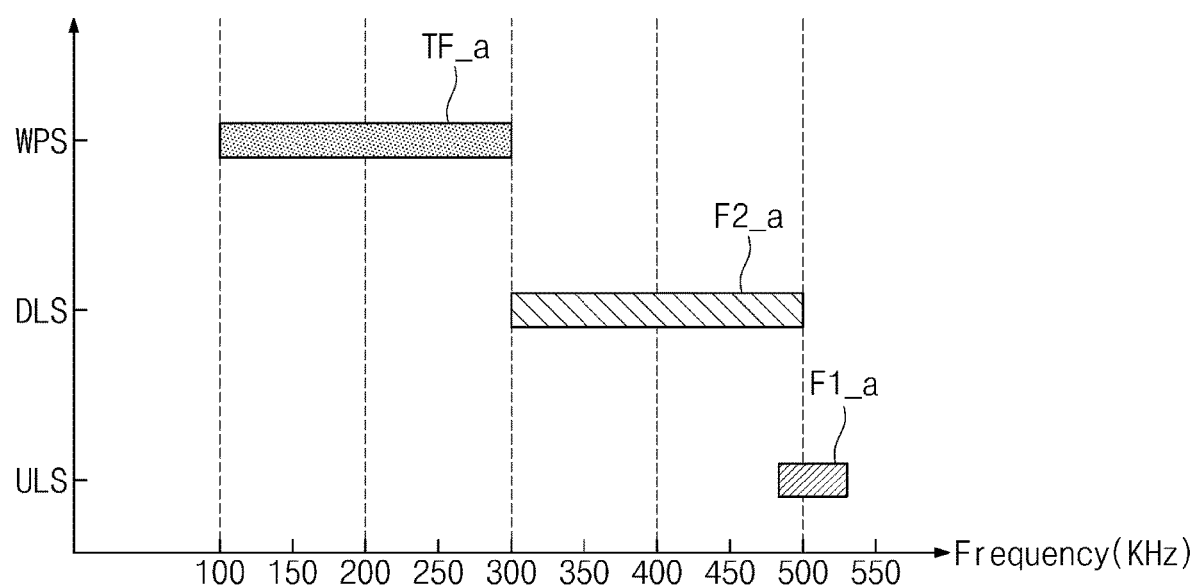
Figure 9C:
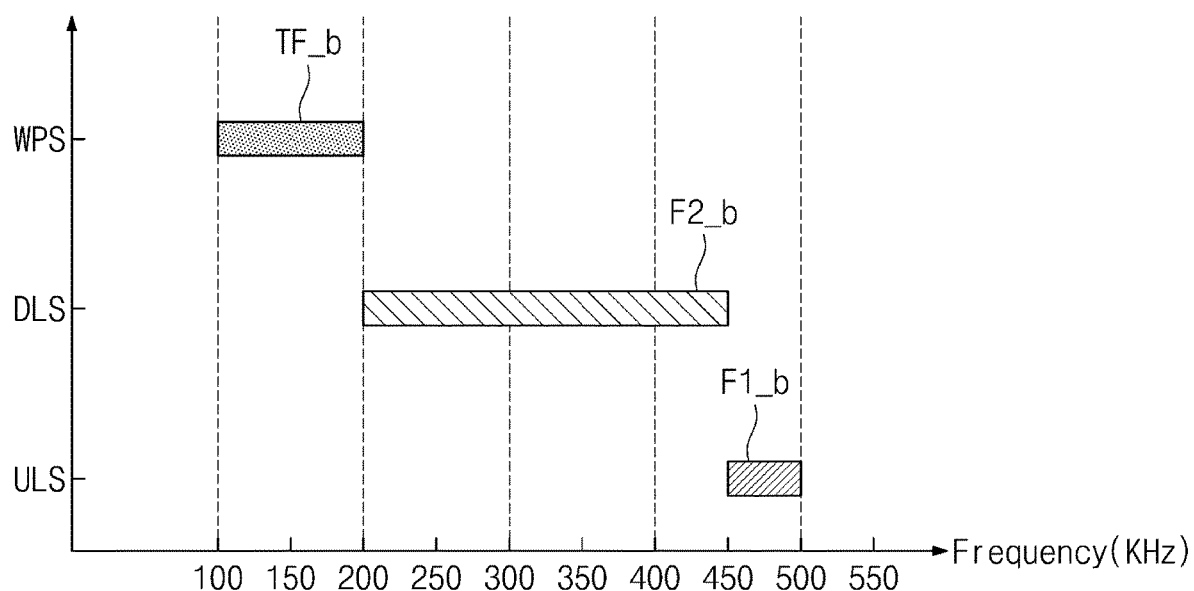

FIGS. 9A to 9C are graphs showing a relation between the first frequency, the second frequency, and the transmission frequency according to some embodiments of the present disclosure.

Referring to FIGS. 3 and 9A, the uplink signal ULS transmitted to the input device AP through the input sensor ISP by the sensor controller 100 has the first frequency F1, and the downlink signal DLS provided to the sensor controller 100 from the input device AP through the input sensor ISP has the second frequency F2. In addition, the wireless power supply WPP may transmit the wireless power signal WPS to the input device AP at the transmission frequency TF.

The first frequency F1 may be in a range of about 450 kHz to about 550 kHz. However, as an example, the first frequency F1 should not be limited thereto or thereby and may be in a range of about 430 kHz to about 580 kHz.

The second frequency F2 may be in a range of about 100 kHz to about 500 kHz. The first and second frequencies F1 and F2 may be the same as each other or may be different from each other. However, as an example, the second frequency F2 should not be limited thereto or thereby and may be in a range of about 80 kHz to about 530 kHz. The sensor controller 100 may transmit information about the frequency required to transmit the downlink signal DLS to the input device AP based on information about protocol version included in the uplink signal ULS. The input device AP may receive the uplink signal ULS from the sensor controller 100 through the input sensor ISP and may determine the second frequency F2 based on the information about the frequency required to transmit the downlink signal DLS included in the uplink signal ULS.

The transmission frequency TF may be in a range of about 100 kHz to about 300 kHz. However, as an example, the transmission frequency TF should not be limited thereto or thereby and may be in a range of about 80 kHz to about 320 kHz. Information about the frequency required to transmit the downlink signal DLS included in the uplink signal ULS may be included in the power control auxiliary signal PCAS that is transmitted to the power controller 200 by the sensor controller 100. Accordingly, the power controller 200 may generate the power control signal PCS used to set the transmission frequency TF of the wireless power signal WPS based on the power control auxiliary signal PCAS and may transmit the power control signal PCS to the wireless power supply WPP.

Referring to FIG. 9B, a second frequency F2_a may be different from a transmission frequency TF_a. The wireless power supply WPP may transmit the wireless power signal WPS to the input device AP at the transmission frequency TF_a that does not overlap the second frequency F2_a of the downlink signal DLS transmitted by the input device AP. In a case where the second frequency F2_a overlaps the transmission frequency TF_a, a noise occurs in the downlink signal DLS by the wireless power signal WPS.

As an example, when the input device AP transmits the downlink signal DLS to the sensor controller 100 at the second frequency F2_a of about 300 kHz to about 500 kHz through the input sensor IPS, the wireless power supply WPP may transmits the wireless power signal WPS to the input device AP at the transmission frequency TF_a of about 100 kHz to about 300 kHz or less. Accordingly, instances of noise being induced into the downlink signal DLS may be prevented or reduced by allowing the second frequency F2_a to be different from the transmission frequency TF_a.

Referring to FIG. 9C, as an example, in a case where the input device AP transmits the downlink signal DLS to the sensor controller 100 at a second frequency F2_b of about 200 kHz to about 450 kHz or less through the input sensor IPS, the wireless power supply WPP may transmit the wireless power signal WPS to the input device AP at a transmission frequency TF_b of about 100 to about 200 kHz or less. In this case, a first frequency F1_b may not overlap the second frequency F2_b. Then, the sensor controller 100 may transmit the uplink signal ULS to the input device AP at the first frequency F1_b of about 450 kHz to 500 kHz through the input sensor IPS.

Figure 10A:
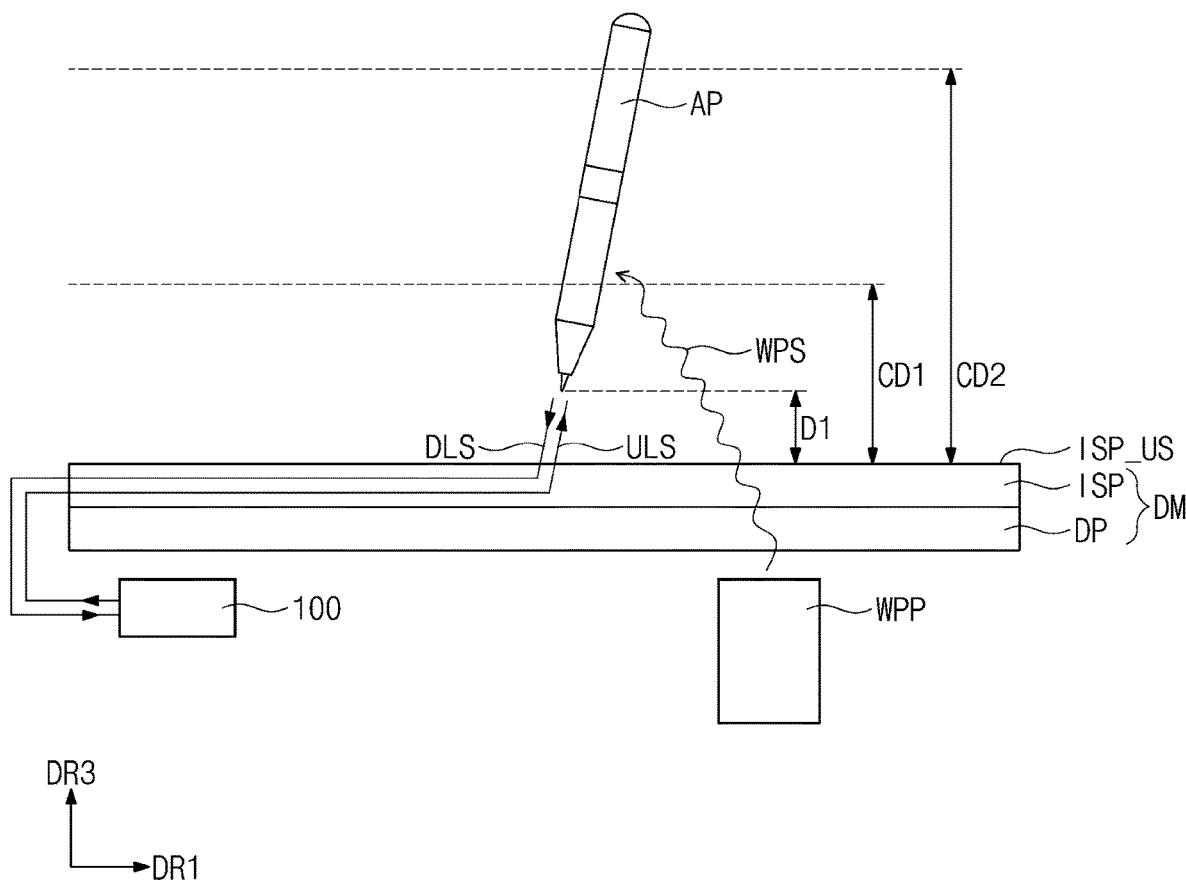
FIGS. 10A to 10C are views showing an operation of a wireless power supply according to a distance between a display device and an input device.
Figure 10B:
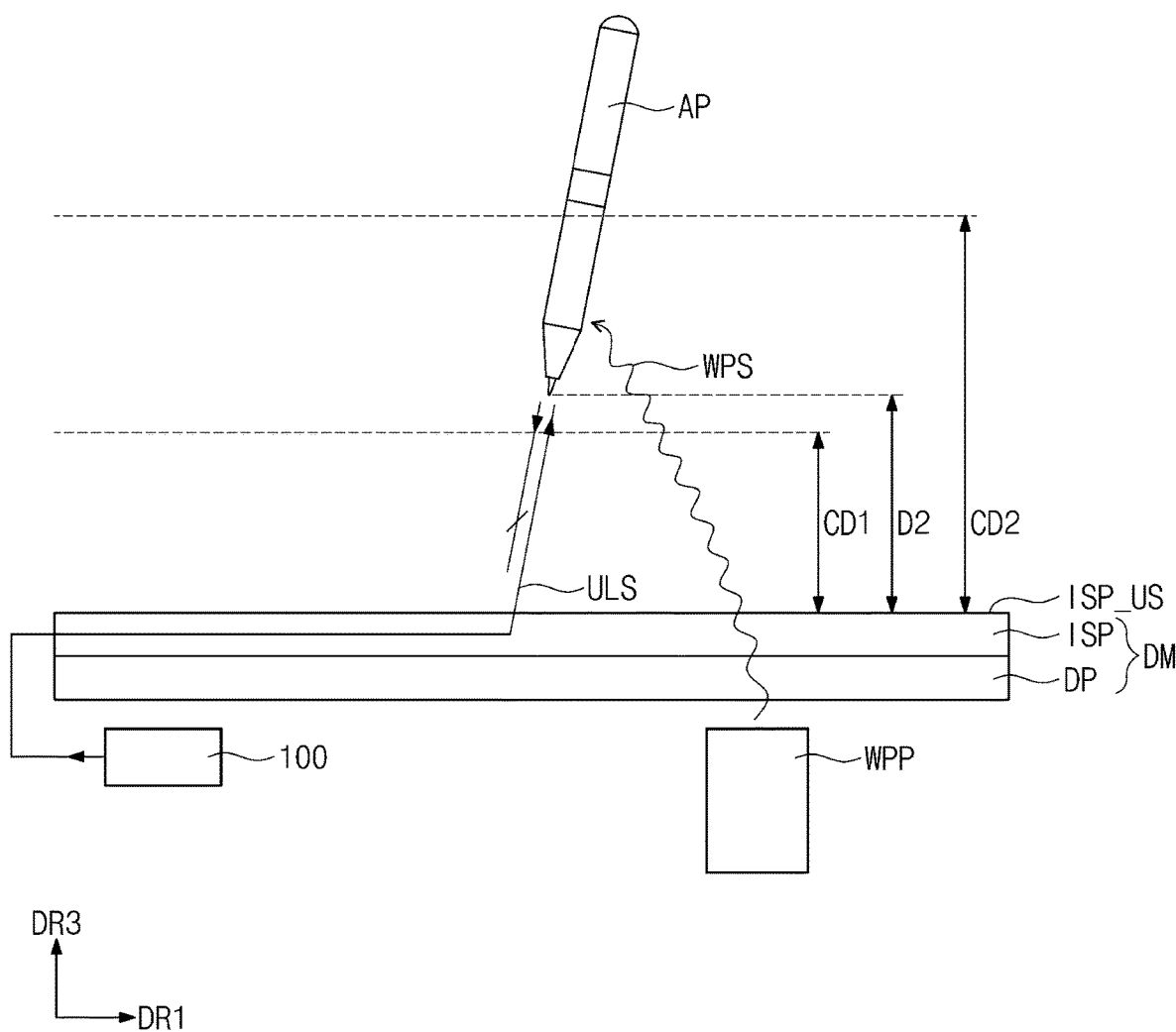
Figure 10C:
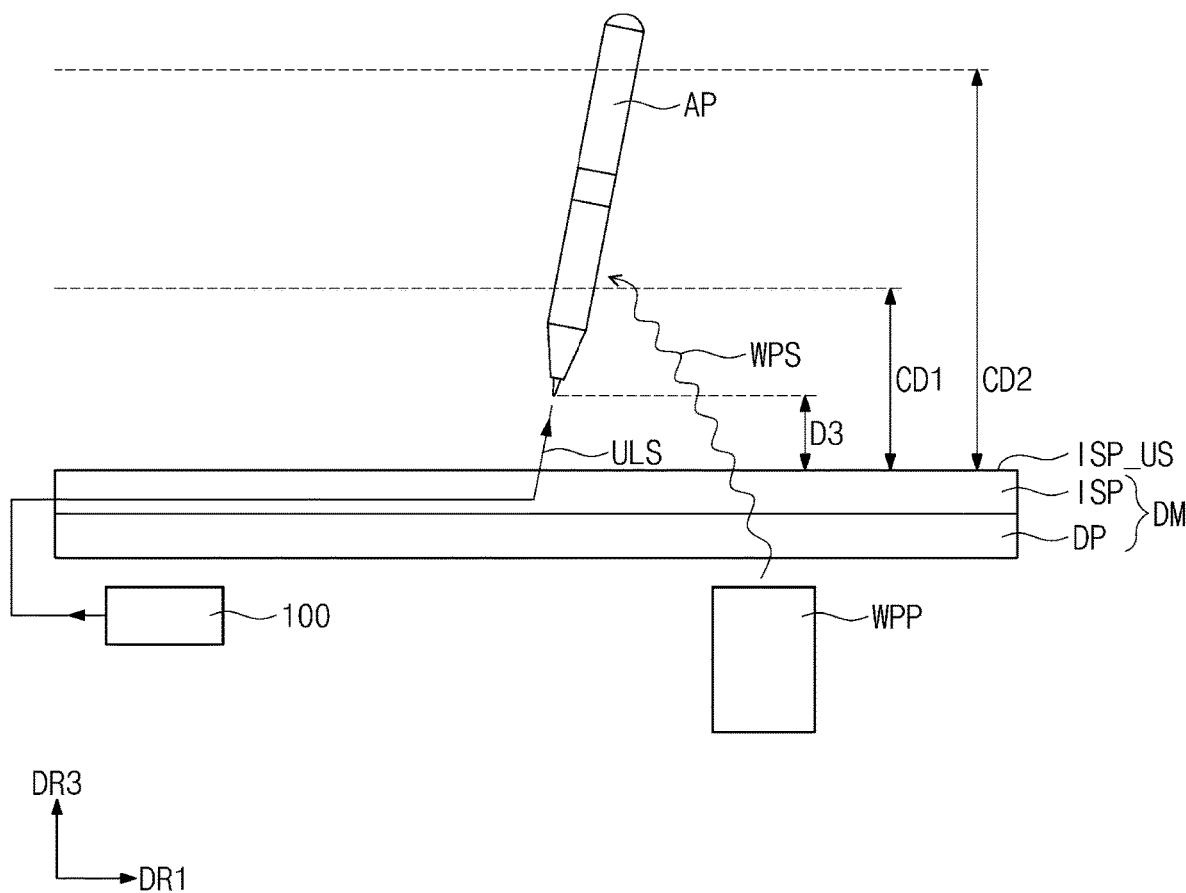

FIGS. 10A to 10C are views showing an operation of the wireless power supply according to a distance between the display device and the input device.

Referring to FIGS. 7A, 9A, and 10A, the input sensor ISP may include an upper surface ISP_US to which the second input TC2 (refer to FIG. 1) is provided by the input device AP. Hereinafter, a distance between the input device AP and the upper surface ISP_US of the input sensor ISP may be defined by a distance in the third direction DR3.

A distance between the input device AP and the upper surface ISP_US of the input sensor ISP in which the sensor controller 100 is able to receive the downlink signal DLS from the input device AP through the input sensor ISP may be defined as a first communication distance CD1. A distance between the input device AP and the upper surface ISP_US of the input sensor ISP in which the sensor controller 100 is able to transmit the uplink signal to the input device AP through the input sensor ISP may be referred to as a second communication distance CD2. The downlink signal DLS may include more information, such as the coordinate information of the second input TC2, than the uplink signal ULS. Accordingly, the second communication distance CD2 may be greater than the first communication distance CD1. However, the first and second communication distances CD1 and CD2 may be the same as each other. As an example, in the case where the first and second communication distances CD1 and CD2 are the same as each other, the wireless power supply WPP may operate in the second charging mode when the sensor controller 100 is in a standby state described later, and the wireless power supply WPP may operate in the first charging mode when the sensor controller 100 is not in the standby state.

Hereinafter, for the convenience of explanation, the second communication distance CD2 will be described as being greater than the first communication distance CD1.

A distance between the input device AP and the upper surface ISP_US of the input sensor ISP is referred to as a first distance D1. As an example, when the first distance D1 is equal to or smaller than the first communication distance CD1, the wireless power supply WPP may operate in the first charging mode.

In the first charging mode, the input device AP may receive the uplink signal ULS from the sensor controller 100 and may transmit the downlink signal DLS to the sensor controller 100. That is, the sensor controller 100 may transmit the uplink signal ULS to the input device AP through the input sensor ISP during the second sensing period SP2 included in the first input sensing period IDP1. In addition, the input device AP may transmit the downlink signal DLS to the sensor controller 100 at the second frequency F2 during the first communication period CP1.

The wireless power supply WPP may transmit the wireless power signal WPS to the input device AP at the transmission frequency TF during the first power supply period PSP1 that does not overlap the first input sensing period IDP1.

Even though the wireless power supply WPP transmits the wireless power signal WPS to the input device AP at the transmission frequency TF different from the second frequency F2, when the first communication period CP1 overlaps the first power supply period PSP1, the noise may occur in the information included in the downlink signal DLS, such as the coordinate information of the second input TC2, the intensity of the input, the slope of the input device AP, and the like, due to the interference between the downlink signal DLS at the second frequency F2 and the wireless power signal WPS at the transmission frequency TF. Accordingly, the first input sensing period IDP1 may not overlap the first power supply period PSP1 in the first charging mode.

Referring to FIGS. 8A, 9A, and 10B, a distance between the input device AP and the upper surface ISP_US of the input sensor ISP is defined as a second distance D2. As an example, when the second distance D2 is greater than the first communication distance CD1 and equal to or smaller than the second communication distance CD2, the wireless power supply WPP may operate in the second charging mode.

In the second charging mode, the input device AP may receive the uplink signal ULS from the sensor controller 100, however, the sensor controller 100 may not receive the downlink signal DLS from the input device AP through the input sensor ISP. That is, during the second sensing period SP2 included in the first input sensing period IDP1, the sensor controller 100 may transmit the uplink signal ULS to the input device AP through the input sensor ISP at the first frequency F1. However, the sensor controller 100 may not receive the downlink signal DLS at the second frequency F2 from the input device AP through the input sensor ISP during the first communication period CP1.

The wireless power supply WPP may transmit the wireless power signal WPS to the input device AP at the transmission frequency TF during the second power supply period PSP2 overlapping the first pause period EP1 and the first communication period CP1.

Even though the second power supply period PSP2 in which the wireless power supply WPP transmits the wireless power signal WPS to the input device AP at the transmission frequency TF overlaps the first communication period CP1, the interference may not occur between the downlink signal DLS and the wireless power signal WPS because the downlink signal DLS provided to the sensor controller 100 does not exist during the first communication period CP1. In addition, in the second charging mode, the wireless power supply WPP may transmit the wireless power signal WPS to the input device AP at the transmission frequency TF during the second power supply period PSP2 more overlapping the second response period RP2.

When compared with the first charging mode, a length of the second power supply period PSP2 in the second charging mode is longer than a length of the first power supply period PSP1 in the first charging mode, and thus, the wireless power supply WPP may transmit more wireless power signal WPS to the input device AP in the second charging mode than in the first charging mode.

Referring to FIGS. 8A, 9A, and 10C, a distance between the input device AP and the upper surface ISP_US of the input sensor ISP is defined as a third distance D3. As an example, in a case where the third distance D3 may be equal to or smaller than the first communication distance CD1 but the sensor controller 100 does not receive the downlink signal DLS from the input device AP through the input sensor ISP, the wireless power supply WPP may operate in the second charging mode.

Although the input device AP is located in the third distance D3 from the upper surface ISP_US of the input sensor ISP, the input device AP may not provide the second input TC2 to the input sensor ISP. In this case, the input device AP may receive the uplink signal ULS from the sensor controller 100 and may transmit only the acknowledgement signal ACK (refer to FIG. 3) to the sensor controller 100 through the input sensor IPS in response to the uplink signal ULS. That is, the sensor controller 100 may be in a state that the sensor controller 100 recognizes the existence of the input device AP based on the acknowledgement signal ACK but does not receive the downlink signal DLS because the second input TC2 is not provided from the input device AP, and this state may be called the standby state.

When the sensor controller 100 is in the standby state, the interference may not occur between the downlink signal DLS and the wireless power signal WPS even though the power supply period in which the wireless power supply WPP transmits the wireless power signal WPS overlaps the first communication period CP1. Accordingly, when the sensor controller 100 is in the standby state, the wireless power supply WPP may operate in the second charging mode.

Figure 11:
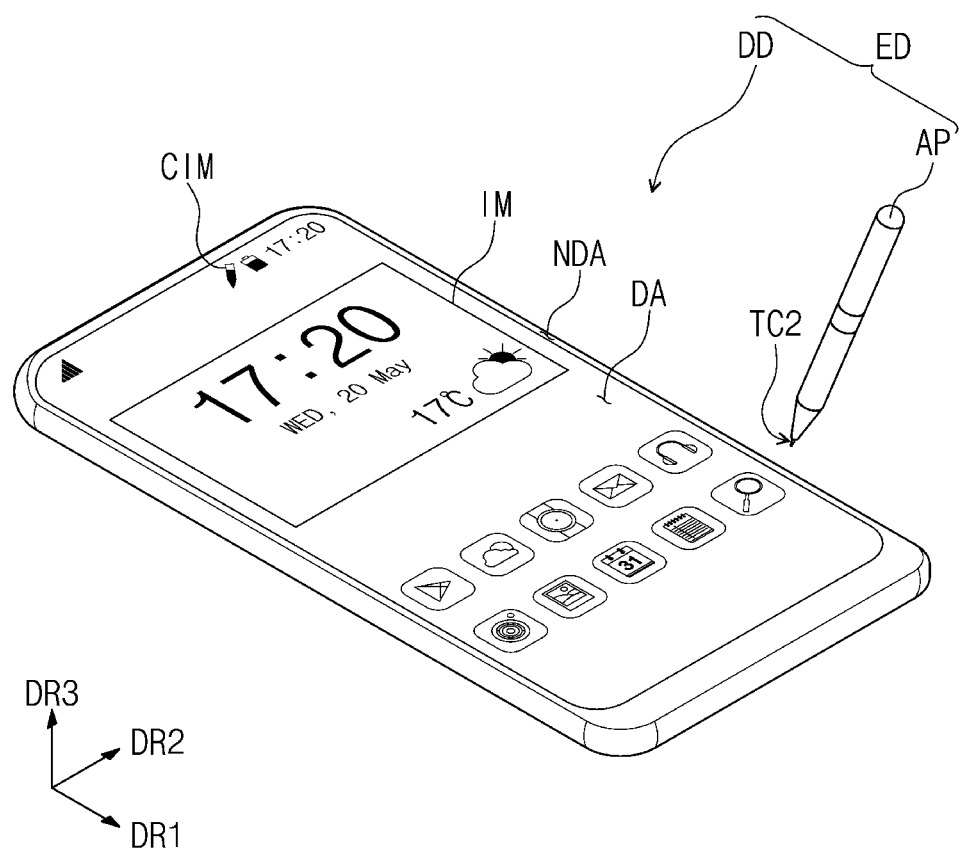
FIG. 11 is a perspective view showing an electronic device when an input sensor is operated in a second mode according to some embodiments of the present disclosure.

FIG. 11 is a perspective view showing the electronic device ED when the input sensor is operated in the second mode according to some embodiments of the present disclosure.

Hereinafter, descriptions on the same elements as those described with reference to FIG. 1 will be omitted in FIG. 11.

Referring to FIGS. 3, 5, and 11, when the input sensor ISP operates in the second mode, the wireless power supply WPP may transmit the wireless power signal WPS to the input device AP. The power receiver PRP of the input device AP may receive the wireless power signal WPS, may generated the power PW, and may supply the generated power PW to the power storage PST. Accordingly, when the input sensor ISP operates in the second mode, the input device AP may charge the power PW in the power storage PST.

In this case, a charge image CIM indicating that the input device AP is being charged may be included in the image IM displayed through the display panel DP. That is, the user US (refer to FIG. 1) may check that the input device AP is being charged based on the charge image CIM displayed through the display panel DP.

Although the embodiments of the present disclosure have been described, it is understood that the present disclosure should not be limited to these embodiments but various changes and modifications can be made by one ordinary skilled in the art within the spirit and scope of the present disclosure as hereinafter claimed.

Therefore, the disclosed subject matter should not be limited to any single embodiment described herein, and the scope of embodiments according to the present inventive concept shall be determined according to the attached claims and their equivalents.

What is claimed is:

1. A display device comprising:
   a display panel comprising a display area at which an image is displayed;
   an input sensor on the display panel and configured to operate in a first mode to sense a first input or in a second mode to sense a second input provided by an input device;
   a sensor controller configured to control an operation of the input sensor;
   a wireless power supply configured to transmit a wireless power signal to the input device at a transmission frequency in response to the input sensor operating in the second mode; and
   a power controller configured to receive a power control auxiliary signal from the sensor controller and to transmit a power control signal to the wireless power supply, and
   wherein the sensor controller is configured to transmit an uplink signal to the input device through the input sensor in the second mode, and the uplink signal comprises a set signal corresponding to the transmission frequency of the wireless power signal, and wherein the power control auxiliary signal comprises recognition information on a presence or absence of the input device, and the power controller is configured to determine whether to supply the wireless power signal based on the recognition information.

2. The display device of claim 1, wherein the sensor controller is configured to sense the first input through the input sensor during a first input sensing frame and to sense the second input through the input sensor during a second input sensing frame, and the wireless power supply is configured to transmit the wireless power signal to the input device during a power supply frame.

3. The display device of claim 2, wherein the second input sensing frame comprises:

an input sensing period in which the sensor controller is configured to sense the second input through the input sensor; and a pause period in which the sensor controller is configured to not sense the second input through the input sensor, the power supply frame comprises a power supply period in which the wireless power signal is transmitted to the input device through the wireless power supply at the transmission frequency, and the pause period overlaps the power supply period.

4. The display device of claim 3, wherein the input sensing period comprises:

an uplink period in which the sensor controller is configured to transmit the uplink signal having a first frequency to the input device through the input sensor; and a downlink period in which the sensor controller is configured to receive a downlink signal having a second frequency from the input device through the input sensor, and the second frequency is different from the transmission frequency.

5. The display device of claim 4, wherein the power control auxiliary signal further comprises input information on whether or not the sensor controller receives the downlink signal.

6. The display device of claim 5, wherein the power controller is configured to determine a length of the power supply period based on the input information.

7. The display device of claim 4, wherein the wireless power supply is configured to operate in a first charging mode in which the wireless power signal is transmitted to the input device during the power supply period that does not overlap the input sensing period and in a second charging mode in which the wireless power signal is transmitted to the input device during the power supply period that partially overlaps the input sensing period.

8. The display device of claim 7, wherein the downlink period overlaps the power supply period in the second charging mode.

9. The display device of claim 7, wherein the wireless power supply is configured to operate in the first charging mode in response to a distance between the display device and the input device being equal to or smaller than a first communication distance and to operate in the second charging mode in response to the distance between the display device and the input device being greater than the first communication distance and equal to or smaller than a second communication distance, the first communication distance is defined as a distance where the sensor controller receives the downlink signal from the input device through the input sensor, and the second communication distance is defined as a distance where the sensor controller transmits the uplink signal to the input device through the input sensor.

10. The display device of claim 9, wherein the wireless power supply is configured to operate in the second charging mode in response to the distance between the display device and the input device being equal to or smaller than the first communication distance and the sensor controller does not receive the downlink signal from the input device through the input sensor.

11. The display device of claim 1, wherein the wireless power supply comprises a conductive coil.

12. An electronic device comprising:

a display panel comprising a display area at which an image is displayed;

an input sensor on the display panel and configured to operate in a first mode to sense a first input or in a second mode to sense a second input;

a sensor controller configured to control an operation of the input sensor;

an input device configured to provide the second input to the input sensor; and a wireless power supply configured to transmit a wireless power signal to the input device at a transmission frequency in response to the input sensor operating in the second mode, and a power controller configured to receive a power control auxiliary signal from the sensor controller and to transmit a power control signal to the wireless power supply, and wherein the sensor controller is configured to transmit an uplink signal having a first frequency to the input device through the input sensor in the second mode, and the uplink signal comprises a set signal corresponding to the transmission frequency of the wireless power signal, and wherein the power control auxiliary signal comprises recognition information on a presence or absence of the input device, and the power controller is configured to determine whether to supply the wireless power signal based on the recognition information.

13. The electronic device of claim 12, wherein the input device comprises:

a communicator configured to receive the uplink signal and to transmit a downlink signal having a second frequency to the sensor controller through the input sensor;

a power receiver configured to receive the wireless power signal; and a controller configured to receive the set signal and to control an operation of the communicator and the power receiver.

14. The electronic device of claim 13, wherein the input device further comprises a power storage charged with a power by the wireless power signal, and the power receiver is configured to generate the power in response to the wireless power signal and to supply the power to the power storage.

15. The electronic device of claim 13, wherein the sensor controller is configured to sense the first input through the input sensor during a first input sensing frame and to sense the second input through the input sensor during a second input sensing frame, the wireless power supply is configured to transmit the wireless power signal to the input device during a power supply frame, the second input sensing frame comprises:

an input sensing period in which the sensor controller is configured to sense the second input through the input sensor; and a pause period in which the sensor controller is configured to not sense the second input through the input sensor, the power supply frame comprises a power supply period in which the wireless power signal is transmitted to the input device through the wireless power supply at the transmission frequency, the pause period overlaps the power supply period, and the second frequency is different from the transmission frequency.

16. The electronic device of claim 15, wherein the input sensing period comprises:

an uplink period in which the sensor controller is configured to transmit the uplink signal to the input device through the input sensor; and a downlink period in which the sensor controller is configured to receive a downlink signal from the input device through the input sensor, and the wireless power supply is configured to operate in a first charging mode in which the wireless power signal is transmitted to the input device during the power supply period that does not overlap the input sensing period and in a second charging mode in which the wireless power signal is transmitted to the input device during the power supply period that overlaps the downlink period.

17. The electronic device of claim 16, wherein the wireless power supply is configured to operate in the first charging mode in response to a distance between the electronic device and the input device being smaller than a first communication distance and to operate in the second charging mode in response to the distance between the electronic device and the input device being greater than the first communication distance and smaller than a second communication distance, the first communication distance is a distance where the sensor controller receives the downlink signal from the input device through the input sensor, and the second communication distance is a distance where the sensor controller transmits the uplink signal to the input device through the input sensor.

18. A display device comprising:

a display panel comprising a display area at which an image is displayed;

an input sensor on the display panel and configured to operate in a first mode to sense a first input or in a second mode to sense a second input provided by an input device;

a sensor controller configured to control an operation of the input sensor; and a wireless power supply configured to transmit a wireless power signal to the input device in response to the input sensor operating in the second mode, wherein the sensor controller is configured to sense the first input through the input sensor during a first input sensing frame and to sense the second input through the input sensor during a second input sensing frame, the wireless power supply is configured to transmit the wireless power signal to the input device during a power supply frame, the second input sensing frame comprises:

an input sensing period in which the sensor controller is configured to sense the second input through the input sensor; and a pause period in which the sensor controller is configured to not sense the second input through the input sensor, the power supply frame comprises a power supply period in which the wireless power signal is transmitted to the input device through the wireless power supply at a transmission frequency, and the pause period overlaps the power supply period.

19. The display device of claim 18, wherein the input sensing period comprises:

an uplink period in which the sensor controller is configured to transmit an uplink signal having a first frequency to the input device through the input sensor; and a downlink period in which the sensor controller is configured to receive a downlink signal from the input device through the input sensor, and the wireless power supply is configured to transmit the wireless power signal to the input device at the transmission frequency.

20. The display device of claim 19, wherein the wireless power supply is configured to operate in a first charging mode in which the wireless power signal is transmitted to the input device during the power supply period that does not overlap the input sensing period and to operate in a second charging mode in which the wireless power signal is transmitted to the input device during the power supply period that overlaps the downlink period.

* * * * *